United States Patent
Jinnai et al.

(10) Patent No.: US 9,539,976 B2
(45) Date of Patent: Jan. 10, 2017

(54) HEAD PROTECTING AIRBAG DEVICE

(71) Applicant: TOYODA GOSEI CO., LTD., Kiyosu-shi, Aichi-ken (JP)

(72) Inventors: Ryosuke Jinnai, Kiyosu (JP); Naoki Hotta, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 15/053,269

(22) Filed: Feb. 25, 2016

(65) Prior Publication Data
US 2016/0288760 A1 Oct. 6, 2016

(30) Foreign Application Priority Data
Mar. 31, 2015 (JP) ................. 2015-071683

(51) Int. Cl.
| | | |
|---|---|---|
| B60R 21/213 | (2011.01) | |
| B60R 21/201 | (2011.01) | |
| B60R 21/237 | (2006.01) | |
| B60R 21/231 | (2011.01) | |

(52) U.S. Cl.
CPC .......... *B60R 21/213* (2013.01); *B60R 21/201* (2013.01); *B60R 21/237* (2013.01); *B60R 21/23138* (2013.01)

(58) Field of Classification Search
CPC .... B60R 21/213; B60R 21/201; B60R 21/237; B60R 21/23138
See application file for complete search history.

(56) References Cited

U.S. PATENT DOCUMENTS

| | | | | |
|---|---|---|---|---|
| 4,669,688 A | * | 6/1987 | Itoh ........................ | F16L 3/23 24/16 PB |
| 7,140,070 B2 | * | 11/2006 | Yuta ...................... | B60N 3/046 16/17 |
| 7,340,856 B1 | * | 3/2008 | Kalouris ................ | G09F 3/204 24/16 PB |
| 2008/0083093 A1 | * | 4/2008 | Saltenberger ......... | F16L 3/1075 24/20 CW |

(Continued)

FOREIGN PATENT DOCUMENTS

| | | | |
|---|---|---|---|
| JP | 2001327051 A | * | 11/2001 |
| JP | 2003160070 A | * | 6/2003 |

(Continued)

*Primary Examiner* — Darlene P Condra
(74) *Attorney, Agent, or Firm* — Posz Law Group, PLC

(57) ABSTRACT

A head protecting airbag device includes: an airbag configured to cover a window of a vehicle; a winding band wound around a folded body which is formed by folding the airbag, the winding band including: an attachment portion being pressed and locked to an attachment target portion; a band body wound around the folded body; an engaging claw portion formed at one end of the band body; and an engaging target portion disposed at the other end of the band body; and a pressing portion, having a pressing operation surface configured to press-fit the engaging claw portion into an engaging concave portion, disposed at a claw-side end of the band body, wherein the attachment portion is disposed at a concave-side end of the band body so that the press-fit direction to the attachment target portion at the time of locking is substantially perpendicular to the pressing operation surface.

8 Claims, 20 Drawing Sheets

(56) References Cited

U.S. PATENT DOCUMENTS

2012/0132761 A1* 5/2012 Elsmore ............... H02G 3/32
                                                                248/74.1
2012/0174343 A1* 7/2012 Fouqueray ............ F16B 2/20
                                                                24/20 EE

FOREIGN PATENT DOCUMENTS

JP          2009-078620 A       4/2009
JP          2013-209011 A       10/2013

* cited by examiner

SCHEMATIC CROSS-SECTION ILLUSTRATING
ENGAGED STATE BETWEEN CLAW PIECES

HEAD PROTECTING AIRBAG DEVICE

CROSS-REFERENCE TO RELATED APPLICATION(S)

This application is based upon and claims the benefit of priority from Japanese Patent Application No. 2015-071683, filed on Mar. 31, 2015, the entire contents of which are incorporated herein by reference.

BACKGROUND

1. Field of the Invention

The present invention relates to ahead protecting airbag device having an airbag which can prevent folding collapse by winding a winding band formed of synthetic resin around a folded body and which is mounted on a vehicle.

2. Description of the Related Art

In the related art, a head protecting airbag device in which a folded shape of a folded body is retained using a winding band has a configuration in which the winding hand includes an attachment portion which is wound around a folded body and attached to an inner panel as a member on a vehicle body side. In the head protecting airbag device, the winding band includes an engaging hole portion, which enables a tip of a band body to be inserted thereinto and engages therewith, at a base end of the band body on a side having the attachment portion. Specifically, unevenness is continuously formed in the length direction of the band body on the tip side of the band body and the tip of the band body inserted into the engaging hole portion is wound around the folded body by causing the unevenness to engage with the inner circumferential edge of the engaging hole portion (for example, see JP-A-2009-78620).

A type of head protecting airbag device which is received in a case of a folded body and is mounted on a vehicle by attaching the head protecting airbag device along with the case to an inner panel on the body side has a configuration in which an attachment portion of a winding band is locked to the case. In the head protecting airbag device, the winding band has a configuration in which an engaging protrusion is formed at one end of a band body and is wound around the folded body by inserting and locking the engaging protrusion into an engaging hole portion formed to penetrate the other end in a state in which the band body is wound on the folded body. In the head protecting airbag device according to the related art, the folded body is attached to a case by disposing a locking protrusion formed to protrude from the band body at an end on the engaging protrusion side of the band body as the attachment portion and locking the locking protrusion to the circumferential edge of a locking hole portion formed in the case as an attachment target portion (for example, see JP-A-2013-209011).

However, in the head protecting airbag device described in JP-A-2009-78620, when the winding band is wound around the folded body, the tip of the band body inserted into the engaging hole portion is pulled with a hand to cause the unevenness to engage with the inner circumferential edge of the engaging hole portion. Accordingly, winding workability of winding the winding band around the folded body is not good.

In the head protecting airbag device described in JP-A-2013-209011, a gripping piece to be gripped in winding the band body around the folded body is formed at an end of the band body on the engaging hole portion side and work of causing the engaging protrusion to engage with the circumferential edge of the engaging hole portion (work of winding the band body around the folded body) can be relatively easily performed by gripping the gripping piece, but the gripping piece does not contribute to attachment of the winding band to the case and attachment of the winding band to the case needs to be performed while gripping the locking protrusion itself. Accordingly, it is necessary to improve attachment workability.

SUMMARY

The present invention is made to solve the above-mentioned problems and an object thereof is to provide a head protecting airbag device that can improve workability of both work of winding a winding band around a folded body and work of attaching the folded body to an attachment target portion.

According to one aspect of the present invention, there is provided a head protecting airbag device including: an airbag configured to cover a window of a vehicle when the airbag is unfolded and inflated, the airbag being folded and received on a vehicle-inside upper edge side of the window; a winding band, formed of flexible synthetic resin, configured to prevent folding collapse of the airbag, wound around a folded body which is formed by folding the airbag so as to release a wound state of the airbag in unfolding and inflating the airbag, the winding band including: an attachment portion being pressed and locked to an attachment target portion to attach the folded body to the attachment target portion; a band body having a belt-like shape, the band body being wound around the folded body; an engaging claw portion formed at one end of the band body; and an engaging target portion disposed at the other end of the band body, the engaging target portion including an engaging concave portion into which the engaging claw portion is inserted to engage therewith; and a pressing portion having a pressing operation surface configured to press-fit the engaging claw portion into the engaging concave portion, the pressing portion being disposed at a claw-side end of the band body so that the pressing operation surface is substantially perpendicular to a press-fit direction of the engaging claw portion, wherein the attachment portion is disposed at a concave-side end of the band body so that the press-fit direction to the attachment target portion at the time of locking is substantially perpendicular to the pressing operation surface so as to press and lock the pressing operation surface to the attachment target portion.

In the head protecting airbag device according to the present invention, the winding band includes the pressing portion that press-fits the engaging claw portion to the engaging concave portion of the engaging target portion. Accordingly, in the work of winding the winding band around the folded body, when the pressing operation surface of the pressing portion is pressed to press-fits the engaging claw portion into the engaging concave portion in a state in which the band body is disposed around the folded body, the engaging claw portion can engage with the engaging target portion and thus the winding band can be wound around the folded body. In the head protecting airbag device according to the present invention, the attachment portion that locks the winding band to the attachment target portion can press the pressing operation surface of the pressing portion to be locked to the attachment target portion. Accordingly, when the winding band wound around the folded body is attached to the attachment target portion, the attachment portion can be locked to the attachment target portion by pressing the pressing operation surface and thus the winding band wound around the folded body can be attached to the attachment target portion. That is, in the head protecting airbag device according to the present invention, since both the work of winding the winding band around the folded body and the work of attaching the winding hand wound around the folded body to the attachment target portion (work of attaching the folded body to the attachment target portion) can be performed by pressing the pressing operation surface of the pressing portion formed in the winding band, it is possible to improve workability and to reduce the number of working steps.

Therefore, with the head protecting airbag device according to the present invention, it is possible to improve workability of the work of winding the winding band around the folded body and the work of attaching the folded body to the attachment target portion.

In the head protecting airbag device according to the present invention, the winding band may be configured to release an engaged state of the engaging claw portion and the engaging target portion in releasing the wound state around the airbag. In this case, it is possible to reliably suppress scattering of a part of the winding band when the airbag is unfolded and inflated, which is desirable.

The winding band may be configured to release the wound state around the airbag by breaking the band body.

Specifically, when the engaged state of the engaging claw portion and the engaging target portion is released at the time of unfolding and inflating the airbag, it is preferable that the winding band be formed of thermoplastic elastomer.

In the head protecting airbag device according to the present invention, a claw piece that retains an engaged state at the time of engagement and that is bent to release the wound state around the airbag at the time of release may be formed on an inner circumferential surface of at least one of the engaging claw portion and the engaging concave portion in this case, since a disengaging timing can be adjusted by adjusting a deflection load of the claw piece, it is possible to stabilize the disengaging timing of the engaging claw portion and the engaging target portion at the beginning of inflation of the airbag with suppressed irregularity, which is desirable.

Specifically, in the head protecting airbag device according to the present invention, the claw piece may be disposed along a length direction of the folded body. In this case, the disengaging timing of the engaging claw portion and the engaging target portion can be adjusted by adjusting the length of the claw piece along the length direction of the folded body, which is desirable.

In addition, in the configuration in which the claw piece is disposed, the claw piece may be disposed between a folded-body-side surface on the inner circumference side of the engaging concave portion and the engaging claw portion. When the inflating airbag is pressed to expand the hand body at the beginning of inflation of the airbag, the claw piece is not disposed in the moving direction (direction which it is separated apart from the center of the cross-sectional face of the folded body) at the time of disengaging the engaging claw portion and the engaging target portion from each other. Accordingly, in comparison with the claw piece is disposed between the surface separated from the folded body on the inner circumference side of the engaging concave portion and the engaging claw portion, it is possible to easily disengage the engaging claw portion and the engaging target portion, which is desirable.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

Figure 1:
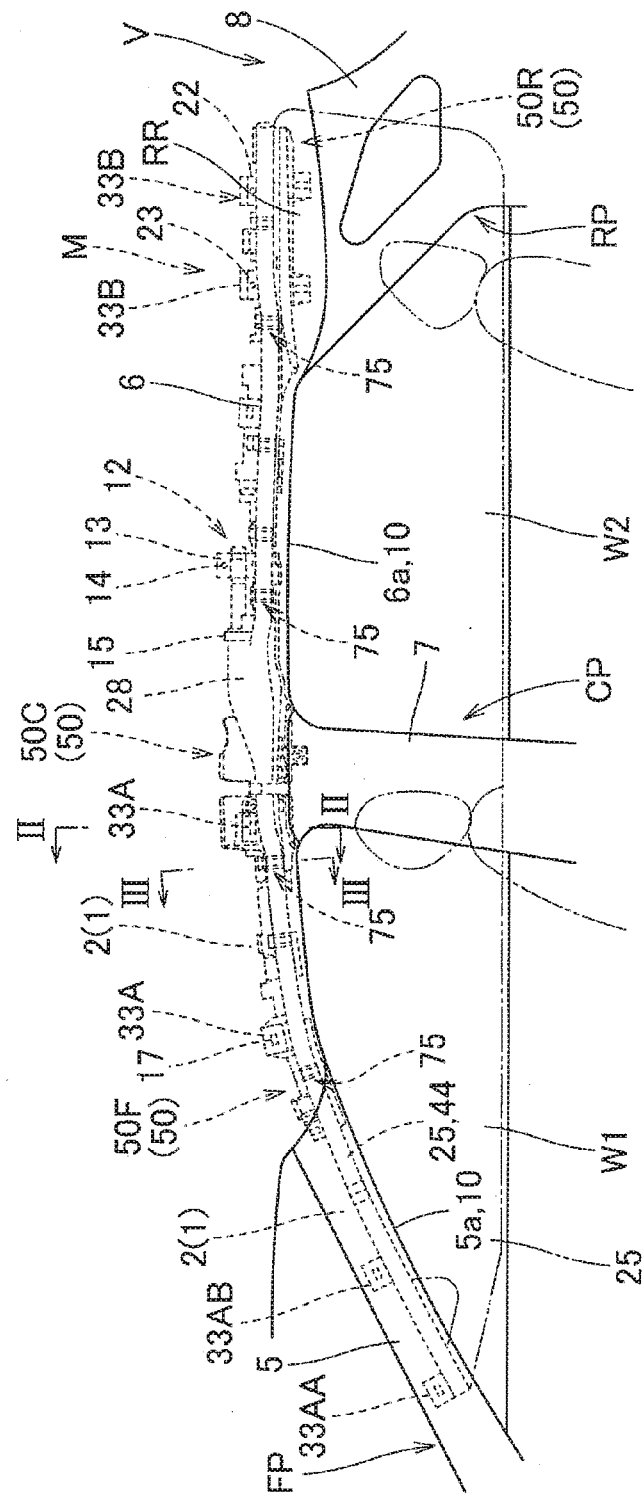
FIG. 1 is a schematic front view of a head protecting airbag device according to an embodiment of the present invention when viewed from a vehicle inside.

Hereinafter, embodiments of the present invention will be described with reference to the accompanying drawings. In a head protecting airbag device M according to the embodiment, as illustrated in FIG. 1, an airbag 25 is folded and received in upper circumferential edges of windows W1 and W2, that is, in a range from a front pillar portion FP to the top of a rear pillar portion RP via a roof side rail portion RR, so as to cover the windows (side windows) W1 and W2 of a vehicle V when the airbag is fully inflated. In this embodiment, a central pillar portion CP arranged substantially in the vertical direction is disposed between the front pillar portion FP and the rear pillar portion RP, and the airbag 25 which has been fully inflated is configured to cover an vehicle inside part of a central pillar garnish 7 disposed in the central pillar portion CP and a rear pillar garnish 8 disposed in the rear pillar portion RP along with the windows W1 and W2, as indicated by a two-dot chained line in FIG. 1.

In this embodiment, it is assumed that upper, lower, front, and rear sides correspond to upper, lower, front, and rear sides of a vehicle V when the head protecting airbag device is mounted on the vehicle.

Figure 2:
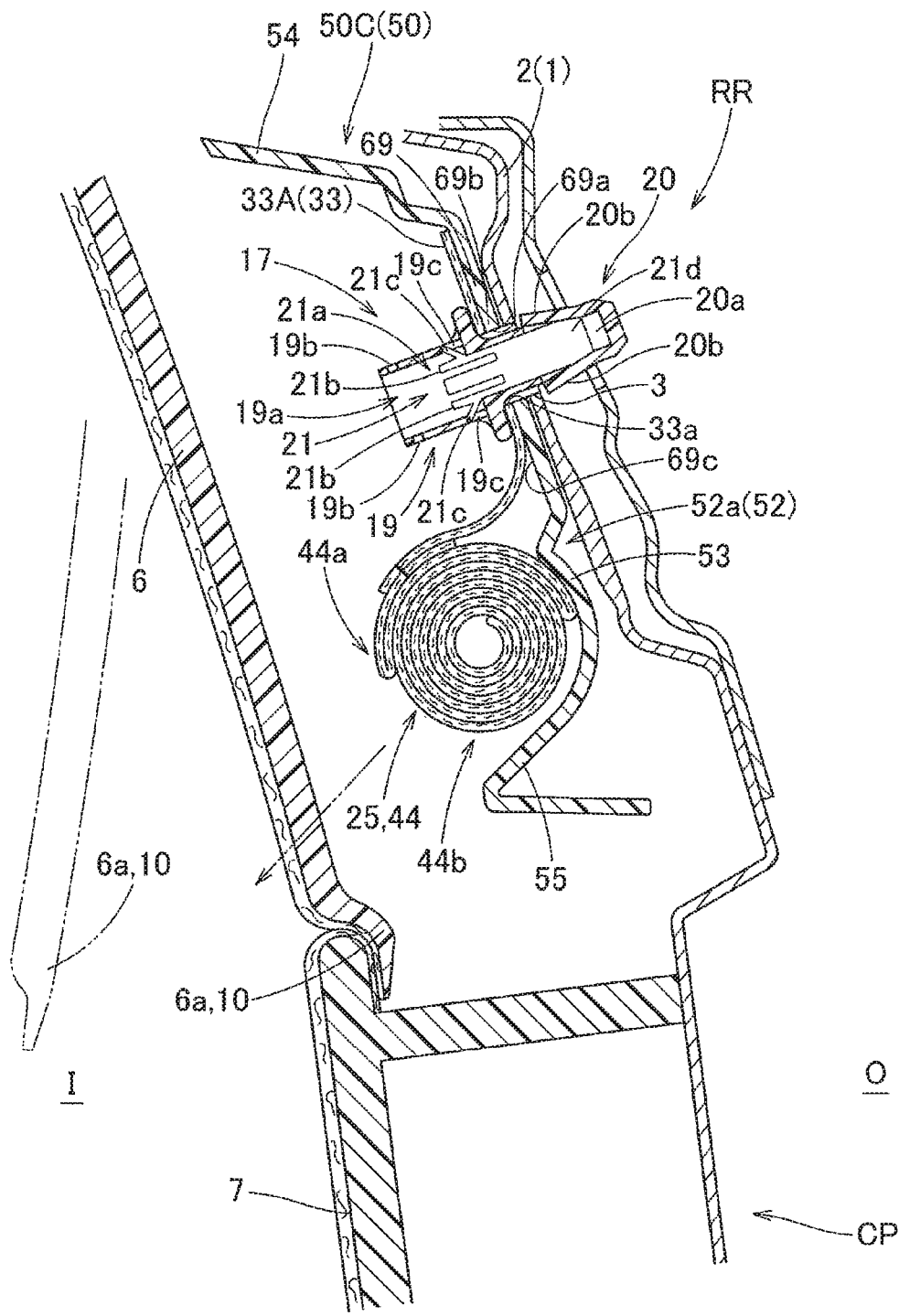
FIG. 2 is a longitudinal sectional view illustrating a state in which the head protecting airbag device according to the embodiment is mounted on a vehicle and corresponds to a part of II-II in FIG. 1.
Figure 3:
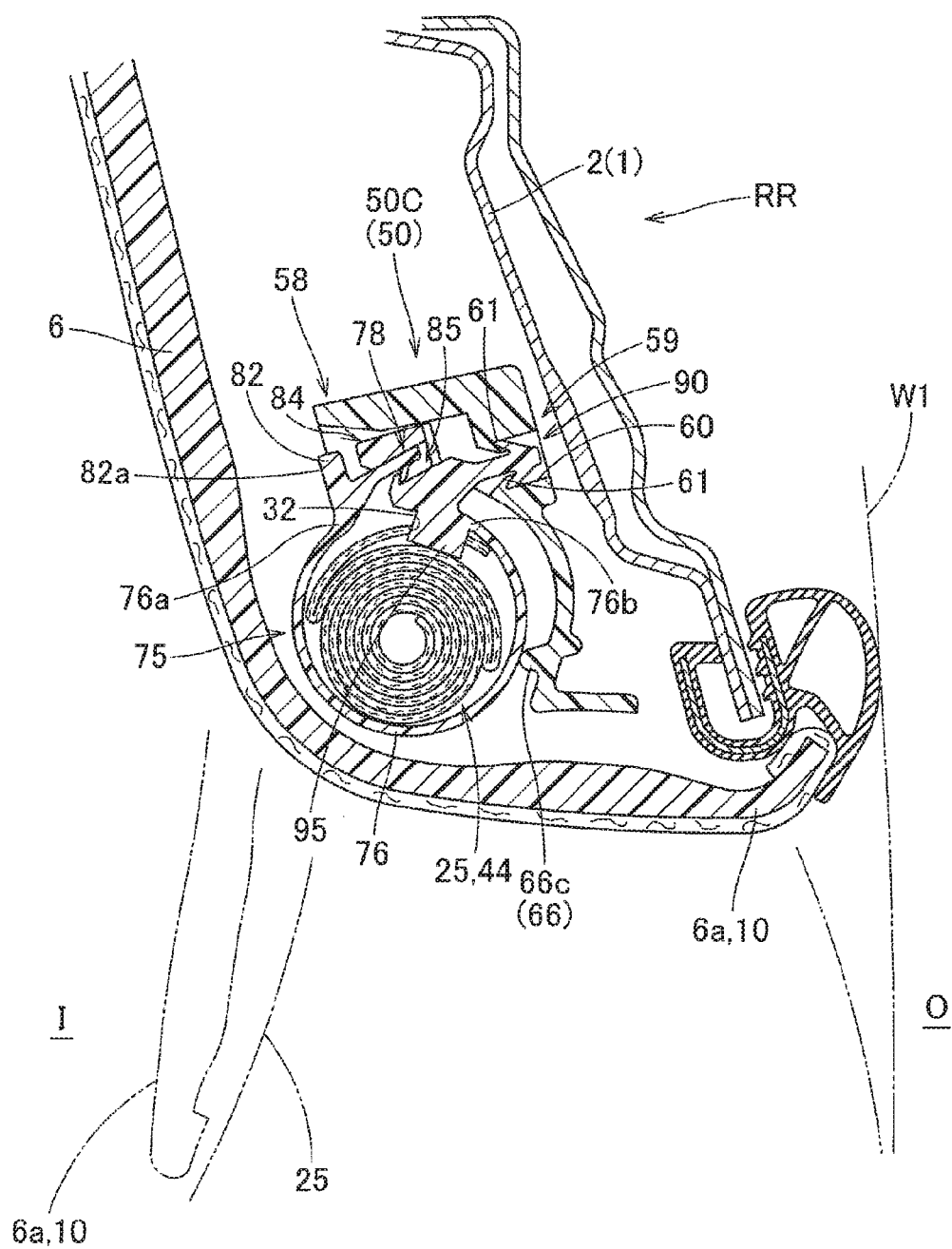
FIG. 3 is a longitudinal sectional view illustrating a state in which the head protecting airbag device according to the embodiment is mounted on a vehicle and corresponds to a part of III-III in FIG. 1.

As illustrated in FIGS. 1 to 3, the head protecting airbag device M includes an airbag 25, an inflator 12 that supplies inflating gas to the airbag 25, an attachment bracket 13, an attachment clip 17, a case 50 that receives the folded airbag 25 (folded body 44), and a winding band 75. The folded airbag 25 (folded body 44), the inflator 23, and the case 50 along with the winding band 75 are received in a state in which a vehicle inside I thereof is covered with an airbag cover 10 when the airbag device is mounted on the vehicle V (see FIGS. 1 to 13). In this embodiment, the airbag cover 10 includes a lower edge 5a of a front pillar garnish 5 covering the vehicle inside of the front pillar portion FP and a lower edge 6a of a roof head lining 6 covering the vehicle inside of the roof side rail portion RR.

The front pillar garnish 5 and the roof head lining 6 along with the central pillar garnish 7 and the rear pillar garnish 8 are formed of a synthetic resin and are attached to the vehicle inside I of the inner panel 2 which is a member on the body 1 side in the front pillar portion FP or the roof side rail portion RR using an attachment element not illustrated. The airbag cover 10 including the lower edges 5a and 6a is pressed by the airbag 25 to open the lower edges 5a and 6a to the vehicle inside I so as to cause the airbag 25 to protrude at the time of unfolding and inflating (see two-dot chained lines in FIGS. 2 and 3).

The inflator 12 supplies inflating gas to the airbag 25, is of a substantially an elliptic cylinder type as illustrated in FIG. 1, and has a gas ejection port (not illustrated) which can eject the inflating gas at the tip thereof. The inflator 12 is formed to extend from the airbag 25 using a clamp 15 disposed on an outer circumference side of a rear end of a connection port portion 28 in a state in which the tip side including the vicinity of the gas ejection port is inserted into the connection port portion 28 of the airbag 25 to be described later. The inflator 12 is attached to the inner panel 2 using an attachment bracket 13 holding the inflator 12 and a bolt 14 fixing the attachment bracket 13 to the inner panel 2 on the body side.

As indicated by a two-dot chained line in FIG. 1, the airbag 25 is configured to introduce the inflating gas from the inflator 12 thereinto, to be unfolded in a folded state, and to be inflated to cover the vehicle inside of the windows W1 and W2 and the central pillar garnish 7 and the rear pillar garnish in the central pillar portion CP and the rear pillar portion RP. As indicated by the two-dot chained lines in FIGS. 2 and 3 and as illustrated in Section A of FIG. 14, the airbag 25 includes a gas inflow portion 26 into which the inflating gas G flows to be inflated to separate a vehicle inside wall portion 26a and a vehicle outside wall portion 26b from each other and anon-inflow portion 30 that is formed to couple the vehicle inside wall portion 26a and the vehicle outside wall portion 26b and into which the inflating gas does not flow. In this embodiment, the gas inflow portion 26 includes a protective inflation portion 27 and a connection port portion 28, and the non-inflow portion 30 includes a circumferential edge portion 31, an attachment portion 33, plate-shaped portions 34 and 35, and a closed portion 36.

Figure 14:
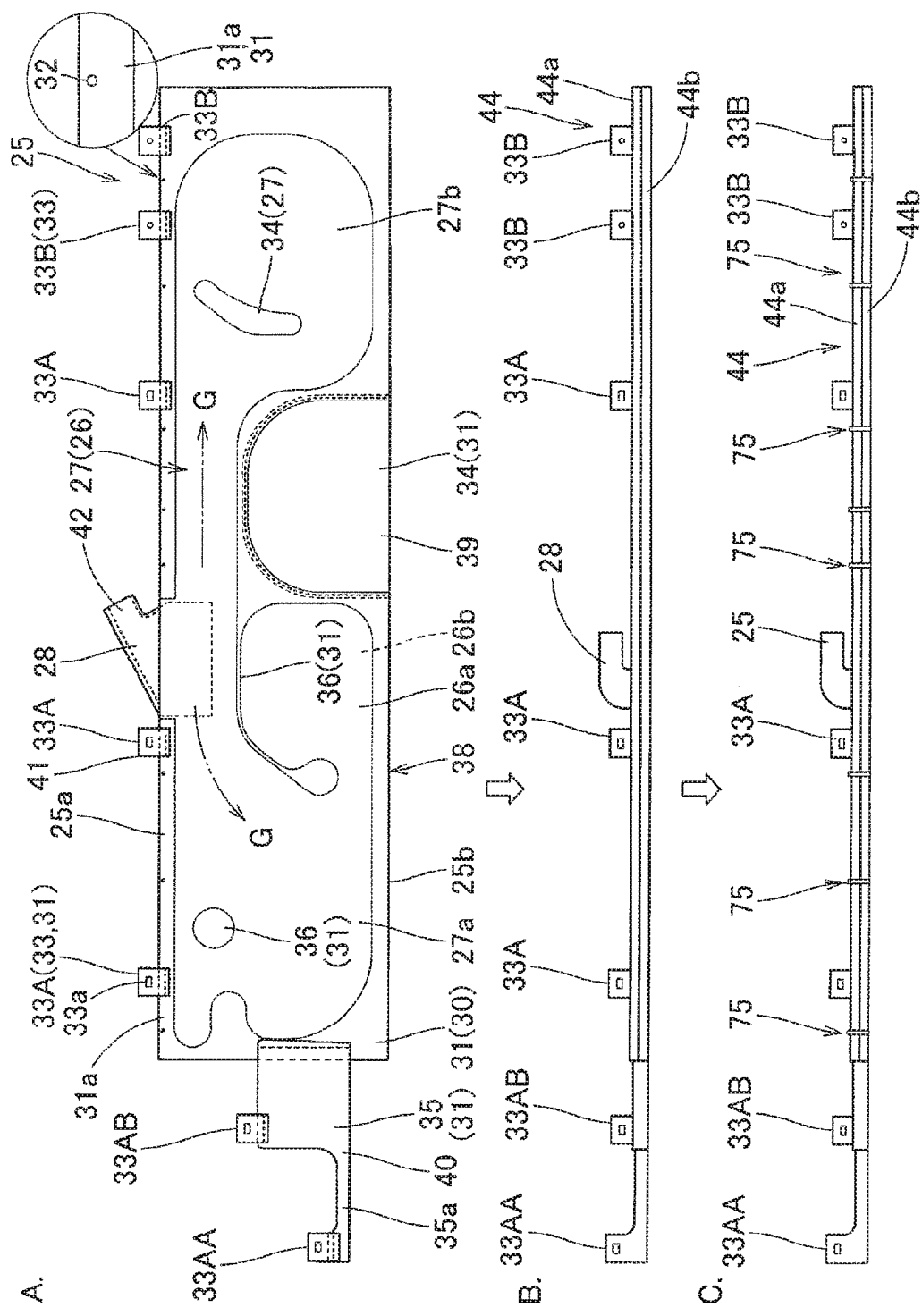
FIG. 14 is a diagram sequentially showing a front view illustrating a state in which an airbag used in the head protecting airbag device according to the embodiment is unfolded flat and diagrams illustrating a state in which the airbag is folded and a winding band is wound around the airbag.

As illustrated in Section A of FIG. 14, the protective inflation portion 27 of the gas inflow portion 26 includes a front protection portion 27a covering a side window W1 of a front seat and a rear protection portion 27b covering a side window W2 of a rear seat, when the airbag 25 is fully inflated. The connection port portion 28 is disposed in the vicinity of the center in the front-rear direction on an upper edge 25a side of the airbag 25 and has a configuration in which the rear part thereof is inclined to rise and is formed to protrude upward from the upper edge 25a side of the airbag 25, and the rear end thereof is opened to be connected to the inflator 12 in this embodiment. The front protection portion 27a and the rear protection portion 27b has the closed portion 36 disposed in an internal area thereof so as to decrease the width in the front-rear direction from the flat-inflated state and to maintain a plate shape extending in the front-rear direction with the thickness regulated when the airbag 25 is fully inflated.

The circumferential edge portion 31 of the non-inflow portion 30 is formed to cover the entire outer circumferential edge of the gas inflow portion 26 except for the rear end of the connection port portion 28. In this embodiment, as illustrated in Section A of FIG. 14, a through-hole 32 into which a locking protrusion 995 to be described later formed in each winding band 75 is inserted is formed in an area on the upper edge 31a side of the circumferential edge portion 31. In this embodiment, the through-hole 32 is opened in a substantially circular shape. The plate-shaped portion 34 is disposed between the front protection portion 27a and the rear protection portion 27b and has a substantially rectangular plate shape. The plate-shaped portion 35 is disposed at the front end of the airbag 25, has a substantially rectangular plate shape, and has a belt portion 35a, which extends to the front side in a substantially belt shape, disposed at the lower end thereof.

The attachment portion 33 is a portion which includes a front end of the belt portion 35a of the plate-shaped portion 35, which is disposed on the upper edge 25a side of the unfolded airbag 25, and which is used to attach the upper edge 25a side of the airbag 25 to the inner panel 2 on the body 1 side of the vehicle V. Plural (seven in this embodiment) attachment portions 33 are arranged in the front-rear direction and each is formed to protrude upward from the upper edge 25a of the airbag 25 including the front end of the belt portion 35a. In the airbag 25 of this embodiment, five attachment portions 33A disposed on the front side are attached to the inner panel 2 using an attachment clip 17 and two attachment portions 33B disposed on the rear side are attached to the inner panel 2 using an attachment bracket 22 and a bolt 23 though not described in detail (see FIGS. 1 and 19). In each attachment portion 33A attached to the inner panel 2 using the attachment clip 17, an attachment hole 33a into which the attachment clip 17 is inserted is formed open in a substantially rectangular shape. In the head protecting airbag device M according to this embodiment, the attachment portion 33AA disposed at the front end of the belt portion 35a and the attachment portion 33AB disposed subsequent thereto are not covered with the case (see FIG. 19), and the attachment portions 33AA and 33AB are directly attached to the inner panel 2 without using the attachment seat portion of the case though not illustrated.

In this embodiment, as illustrated in Section A of FIG. 14, the airbag 25 includes a body portion 38 which is formed by hollow weaving using polyamide yarn, polyester yarn, or the like and individual fabrics 39, 40, 41, and 42 that is formed of woven fabrics of polyamide yarn, polyester yarn, or the like and is sewn on the body portion 38. The individual fabric 39 constitutes a part of the plate-shaped portion 34, and the individual fabric 40 constitutes a part of the plate-shaped portion 35. The individual fabric 41 constitutes apart of the attachment portion 33, and the individual fabric 42 constitutes a part of the connection port portion 28. The body portion 38 has a substantially rectangular shape and constitutes a part of the front protection portion 27a, the rear protection portion 27b, the circumferential edge portion 31, and the plate-shaped portion 34. In the airbag 25 according to this embodiment, a part of the plate-shaped portion 34 in the body portion 38 formed by hollow weaving is cut out and the cut part is formed of the individual fabric 42 constituting the connection port portion 28. In the area cut out in the body portion 38, the individual fabric 39 is disposed to cover the area to form the plate-shaped portion 34.

Figure 15:
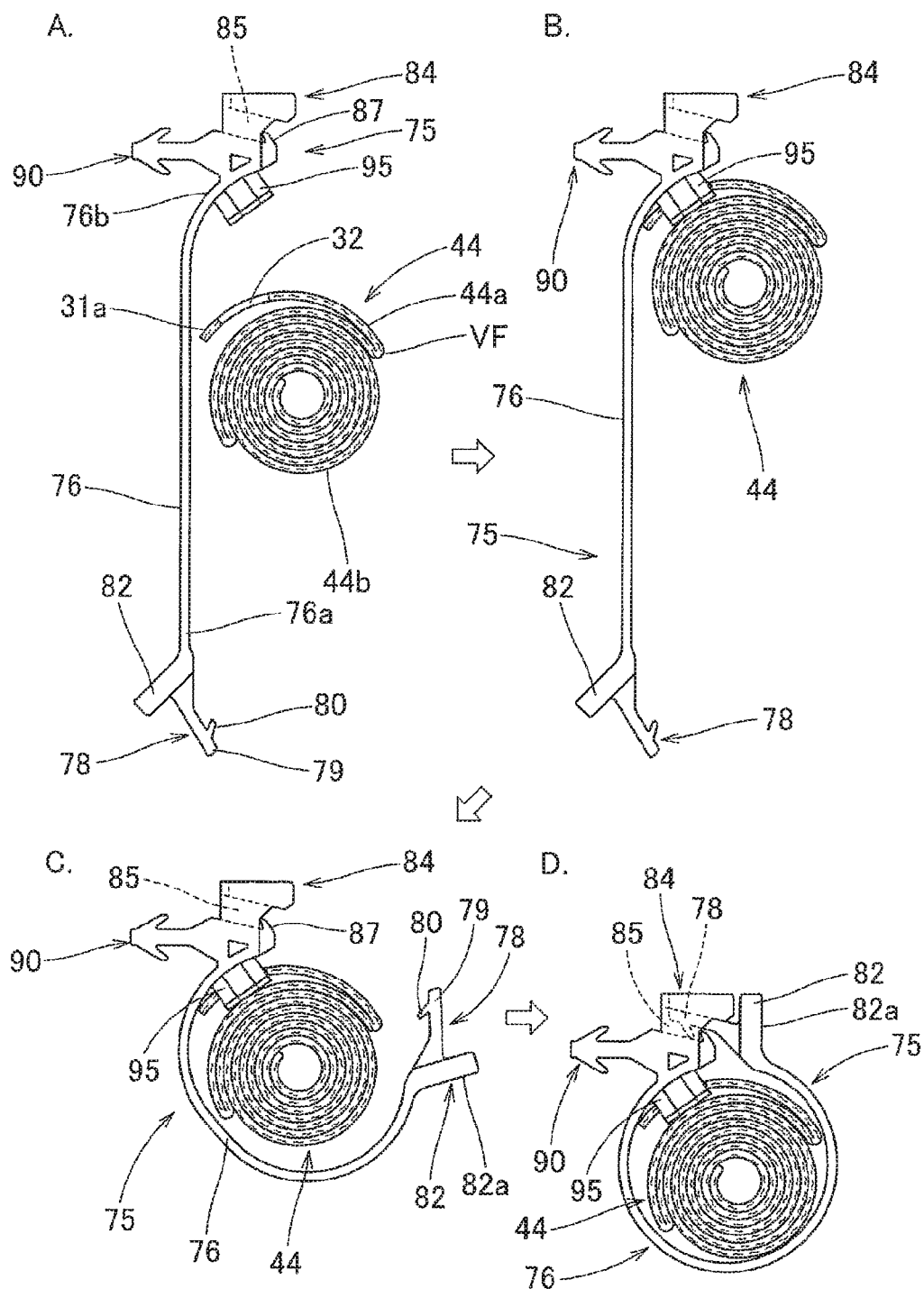
FIG. 15 is a diagram sequentially illustrating a state in which the winding band illustrated in FIGS. 10A and 10B is wound around a folded body.

In this embodiment, the airbag 25 is folded by bellows-folding the area on the upper edge 25a side and roll-folding the area on the lower edge side to be rolled to the vehicle outside O from the lower edge 25b side. In the folded body 44 which is formed by folding the airbag 25, as illustrated in FIG. 15, the bellows-folded portion 44a is placed above the roll-folded portion 44b, the upper edge 31a side of the circumferential edge portion 31 is exposed from the top surface of the bellows-folded portion 44a, and the through-hole 32 for locking the locking protrusion 95 of the winding band 75 is also exposed therefrom.

Figure 19:
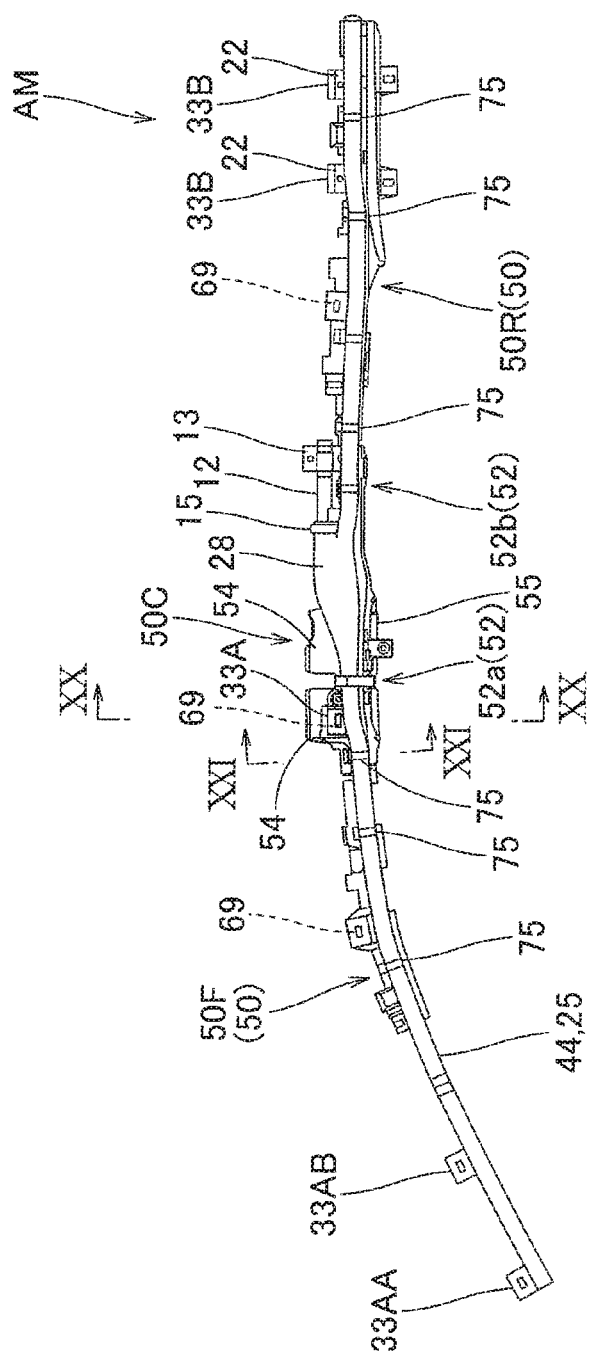
FIG. 19 is a front view illustrating an airbag assembly in the head protecting airbag device according to the embodiment.

In this embodiment, the case 50 in which the folded airbag 25 (folded body 44) is received is formed of a synthetic resin such as polyolefin-based thermoplastic elastomer (TPO) and has along shape extending in the front-rear direction. In the head protecting airbag device M according to this embodiment, as illustrated in FIG. 19, three cases of a case 50F receiving a part of the front protection portion 27a, a case 50R receiving a part of the rear protection portion 27b, and a case 50C receiving a part in the vicinity of the connection port portion 28 are used for the folded body 44. The case 50F disposed on the front side has a front side bent downward to correspond to the front area on the upper edge side of the window W1, and the cases 50C and 50F are formed to extend in a substantially straight line shape in the front-rear direction to correspond to the upper edge side of the window W2 from the rear area on the upper edge side of the window W1 (see FIG. 1). In this embodiment, the case 50C disposed at the center will be exemplified in details. The cases 50F and 50R have different outer shapes but are the same as the case 50C in the configuration of attaching the winding band 75 and the configuration of attaching the attachment portion 33A of the airbag 35 using the attachment clip 17. In the head protecting airbag device M according to this embodiment, the case 50 (50F, 50C, and 50R) constitutes an attachment target portion to which the folded body 44 is attached using the winding band 75. The case 50 serves as a protector of protecting the folded airbag 25 (folded body 44) in carrying, mounting on a vehicle, inflation, and the like and guiding the unfolding direction at the time of inflation, and is disposed around the folded body 44 so as to cover the folded body 44 from surrounding obstacles.

As illustrated in FIGS. 4 to 9, the case 50C includes a receiving portion 52 that receives the folded body 44, a locking target portion 58 to which a locking clip 90 as an attachment portion formed in the winding band 75 is locked, and an attachment seat portion 69 that is attached to the inner panel 2 on the body 1 side.

In a front area 52a in the vicinity of the connection port portion 28 connected to the inflator 12, the receiving portion 52 is configured to cover the upper side of the area, the vehicle side, and the bottom surface thereof (see FIG. 2). In a rear area 52b disposed on the rear side of the inflator 12, the receiving portion 52 is configured to cover the vehicle side of the folded body 44 (see FIGS. 4 and 5). That is, the receiving portion 52 includes a side wall portion 53 to cover the vehicle outside O of the folded body 44, a top wall portion 54 that partially extends upward in the vehicle inside from the upper end of the side wall portion 53 in the vicinity of the center in the front-rear direction of the side wall portion 53, and a bottom wall portion 55 that extends partially downward in the vehicle inside from the lower end of the side wall portion 53 in the vicinity of the center in the front-rear direction of the side wall portion 53, in the front area 52a, and includes only the side wall portion 53 in the rear area 52b. The bottom wall portion 55 covering the lower surface side of the folded body 44 is formed in an area disposed above the central pillar portion CP. In the central pillar portion CP, as illustrated in FIG. 2, the central pillar garnish 7 is disposed to protrude to the vehicle inside from the front and rear windows W1 and W2. The bottom wall portion 55 serves to guide the protruding to the vehicle inside of the airbag 25 at the beginning of inflation is disposed to cause the airbag 25 at the beginning of inflation not to interfere with the upper end of the central pillar garnish 7 and to smoothly protrude downward in the vehicle inside. Specifically, the bottom wall portion 55 is inclined with respect to the vehicle width direction (right-left direction) to direct the vehicle inside end thereof to the lower side.

Figure 4:
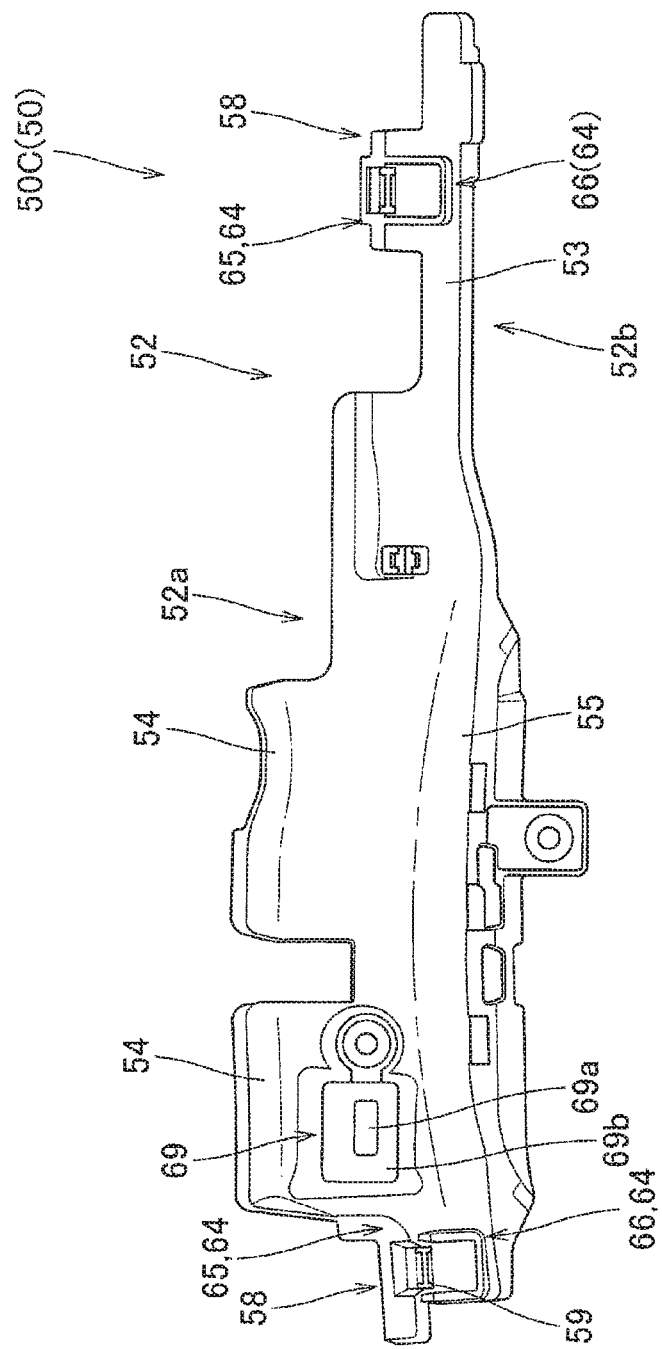
FIG. 4 is a front view of a case which is used in the head protecting airbag device according to the embodiment.
Figure 5:
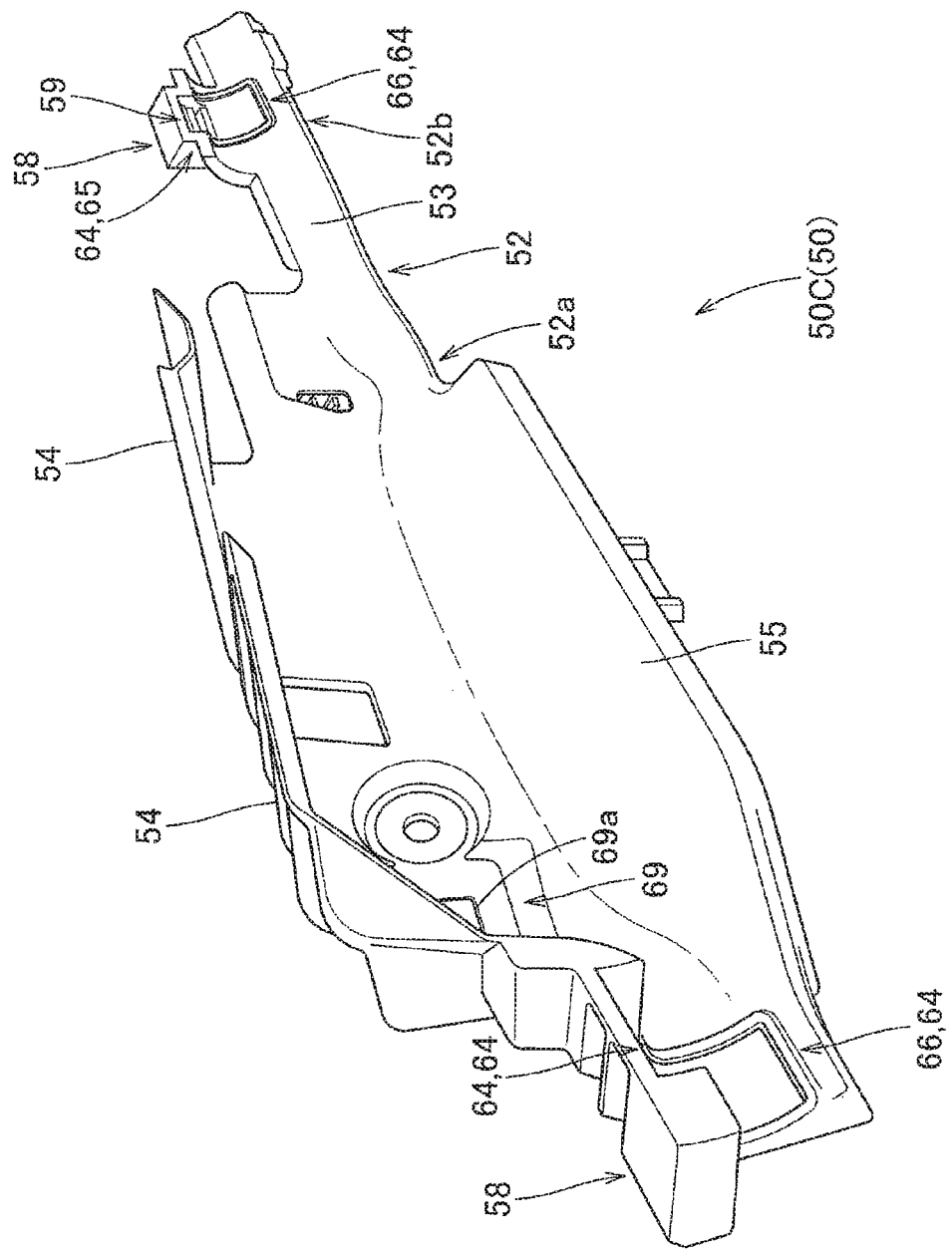
FIG. 5 is a schematic perspective view of the case illustrated in FIG. 4.

The locking target portion 58 to which the winding band 75 is locked is disposed on the upper side of the receiving portion 52, and is formed is formed at two positions of both ends in the front-rear direction of the case 50C in this embodiment (see FIGS. 4 and 5). As illustrated in FIGS. 6 to 9, the locking target portion 58 includes a locking hole portion 59 disposed at the upper end of the side wall portion 53 and a reinforcing portion 64 disposed to surround the locking hole portion 59.

The locking clip 90 to be described later is inserted into the locking hole portion 59, and the locking hole portion 59 includes a hole body 60 that is formed open in a rectangular shape of which the length direction is substantially parallel to the front-rear direction (the length direction of the folded body 44) and locking convex portions 61 and 61 that are formed in an upper edge 60a and a lower edge 60b of the frame on the vehicle inside I on the inner circumference side of the hole body 60. The hole body 60 penetrates the locking target portion in the vehicle inside-outside direction and is configured to insert the locking clip 90 thereinto (see FIG. 7). The locking convex portions 61 are inclined with respect to the vehicle inside-outside direction (the right-left direction) to extend from the upper edge 60*a* side and the lower edge 60*b* side of the frame on the vehicle inside I of the hole body 60 and to go to the center in the vertical direction to the vehicle outside O. The inclination of the locking convex portion 61 is formed to lock a locking claw portion 92 to be described later of the locking clip 90 thereto, and the locking convex portion 61 is disposed on the base side (the vehicle inside I) of each locking claw portion 92 of the locking clip 90 to lock the corresponding locking claw portion 92 when the locking clip 90 is inserted into the locking hole portion 59. The width in the front-rear direction (the width in the direction parallel to the length direction of the folded body 44) of each locking convex portion 61 is set to be substantially equal to the width in the front-rear direction of the locking clip 90.

Figure 6:
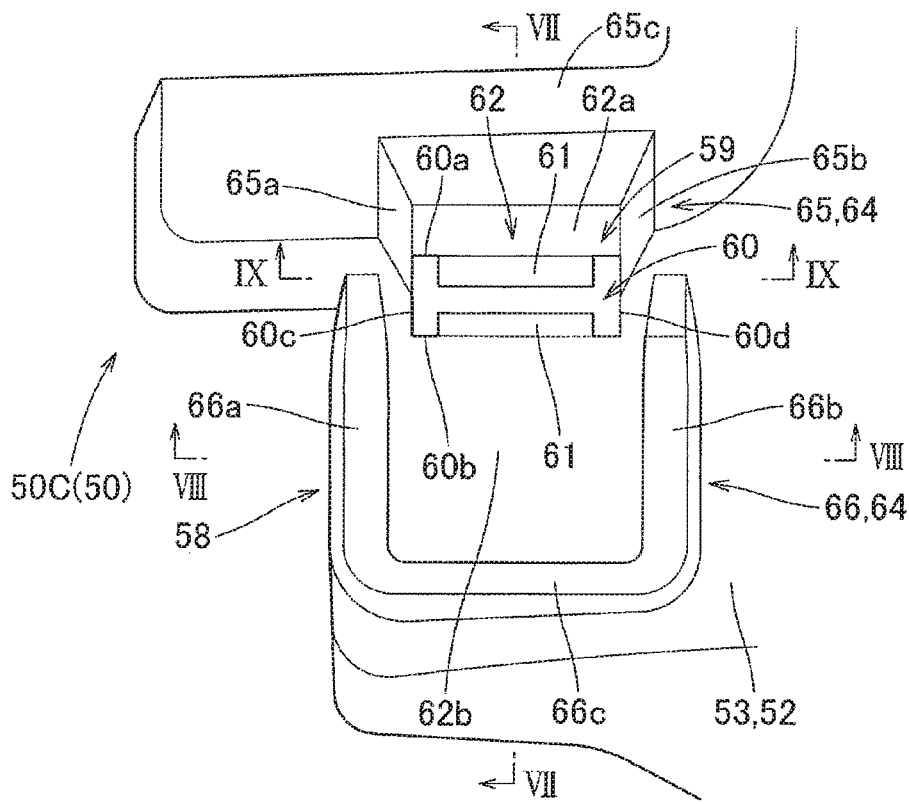
FIG. 6 is a partially enlarged front view illustrating a part of a locking target portion in the case illustrated in FIG. 4.
Figure 7:
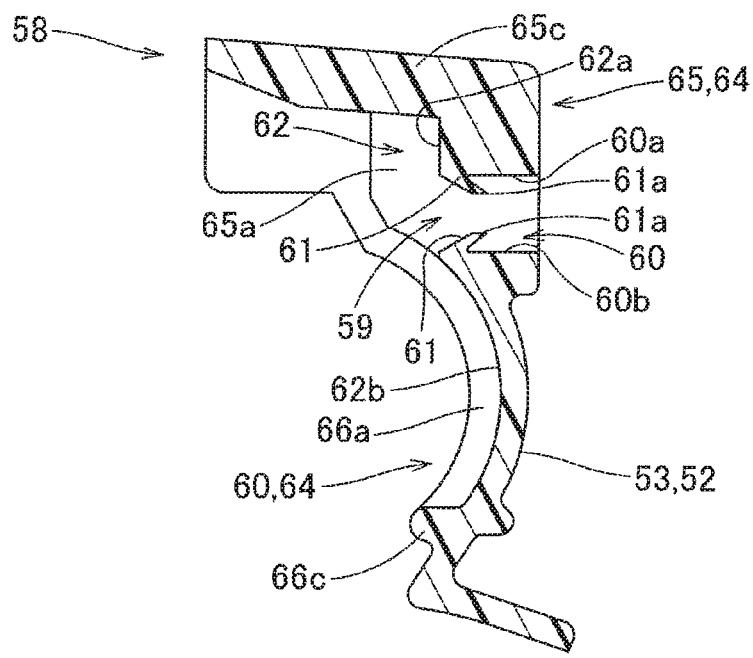
FIG. 7 is a cross-sectional view taken along line VII-VII in FIG. 6.
Figure 8:
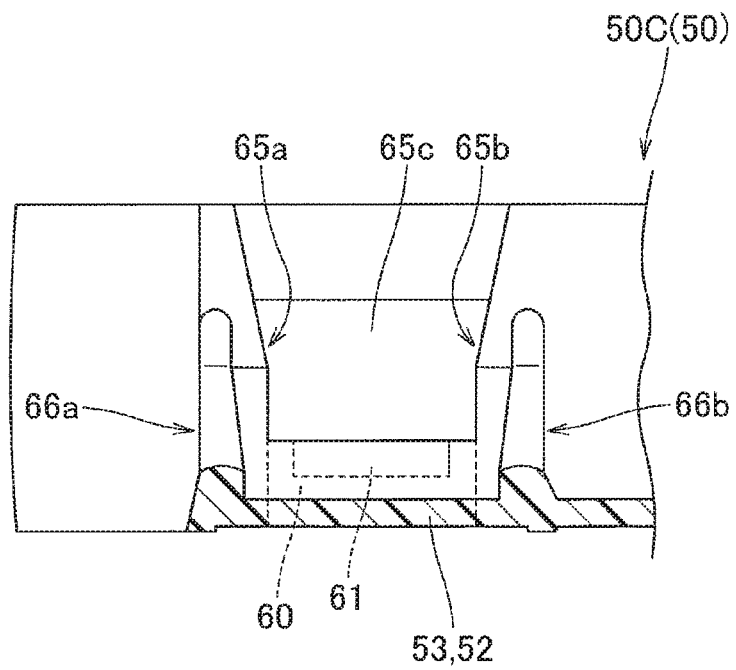
FIG. 8 is a cross-sectional view taken along line VIII-VIII in FIG. 6.

As illustrated in FIG. 6, the reinforcing portion 64 includes an upper reinforcing portion 65 that is disposed to surround both ends in the front-rear direction and the upper edge of the locking hole portion 59 and a lower reinforcing portion 66 that is formed to extend to the area of the receiving portion 52 (the side wall portion 53) at the lower edge of the locking hole portion 59.

Figure 9:
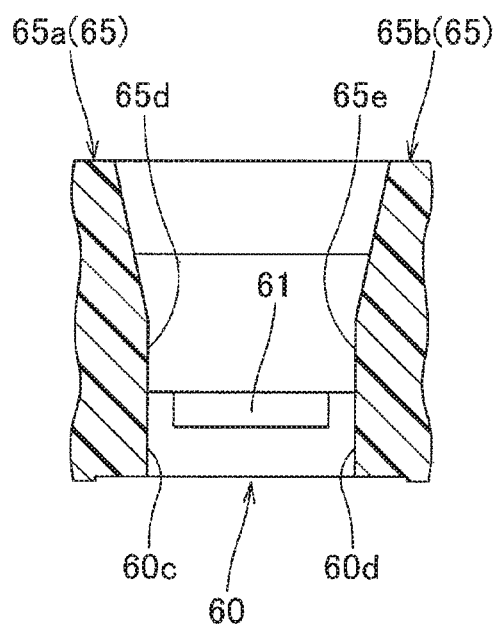
FIG. 9 is a cross-sectional view taken along line IX-IX in FIG. 6.
Figure 10A:
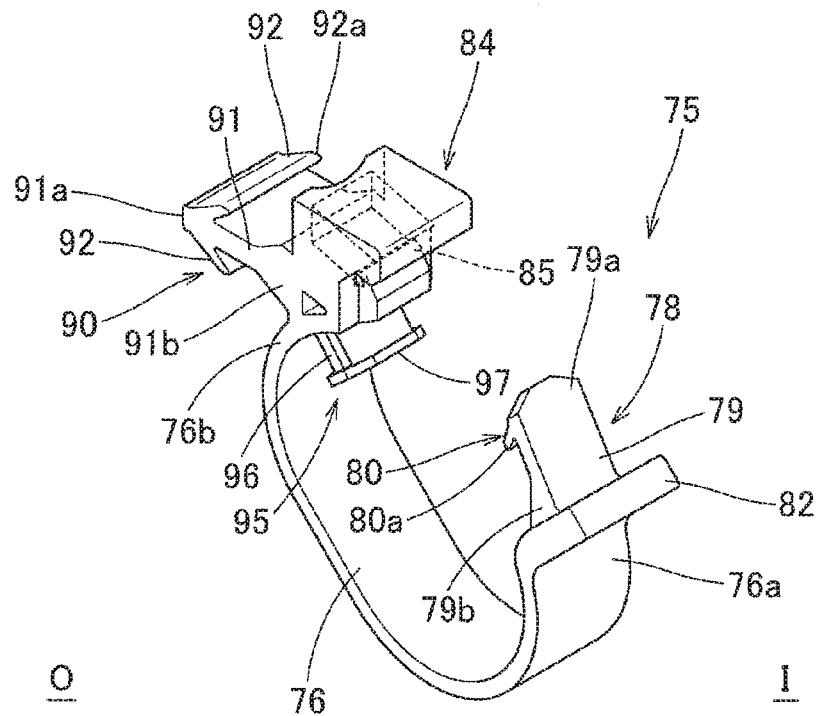
FIGS. 10A and 10B are perspective views of a winding band which is used in the head protecting airbag device according to the embodiment and illustrate a state before an engaging claw portion engages with an engaging target portion and a state after the engaging claw portion engages with the engaging target portion.
Figure 10B:
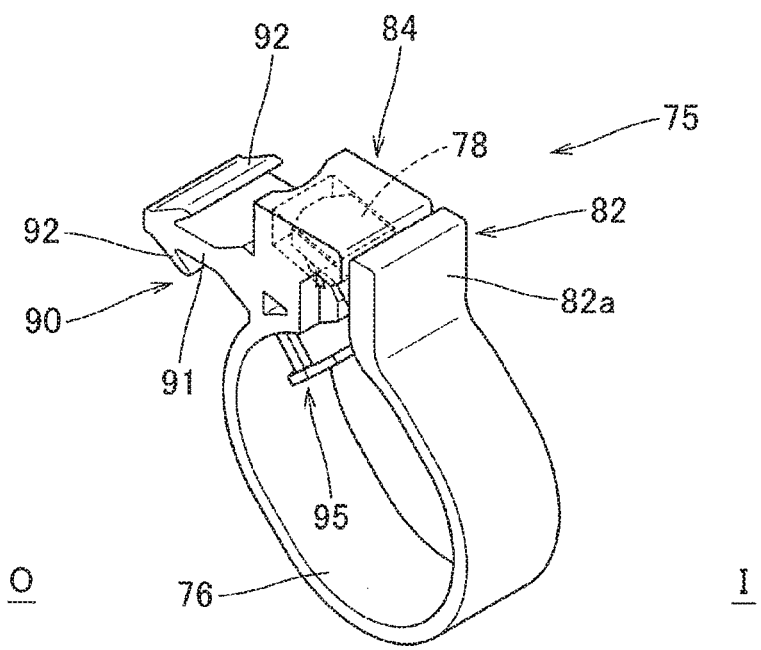
Figure 11:
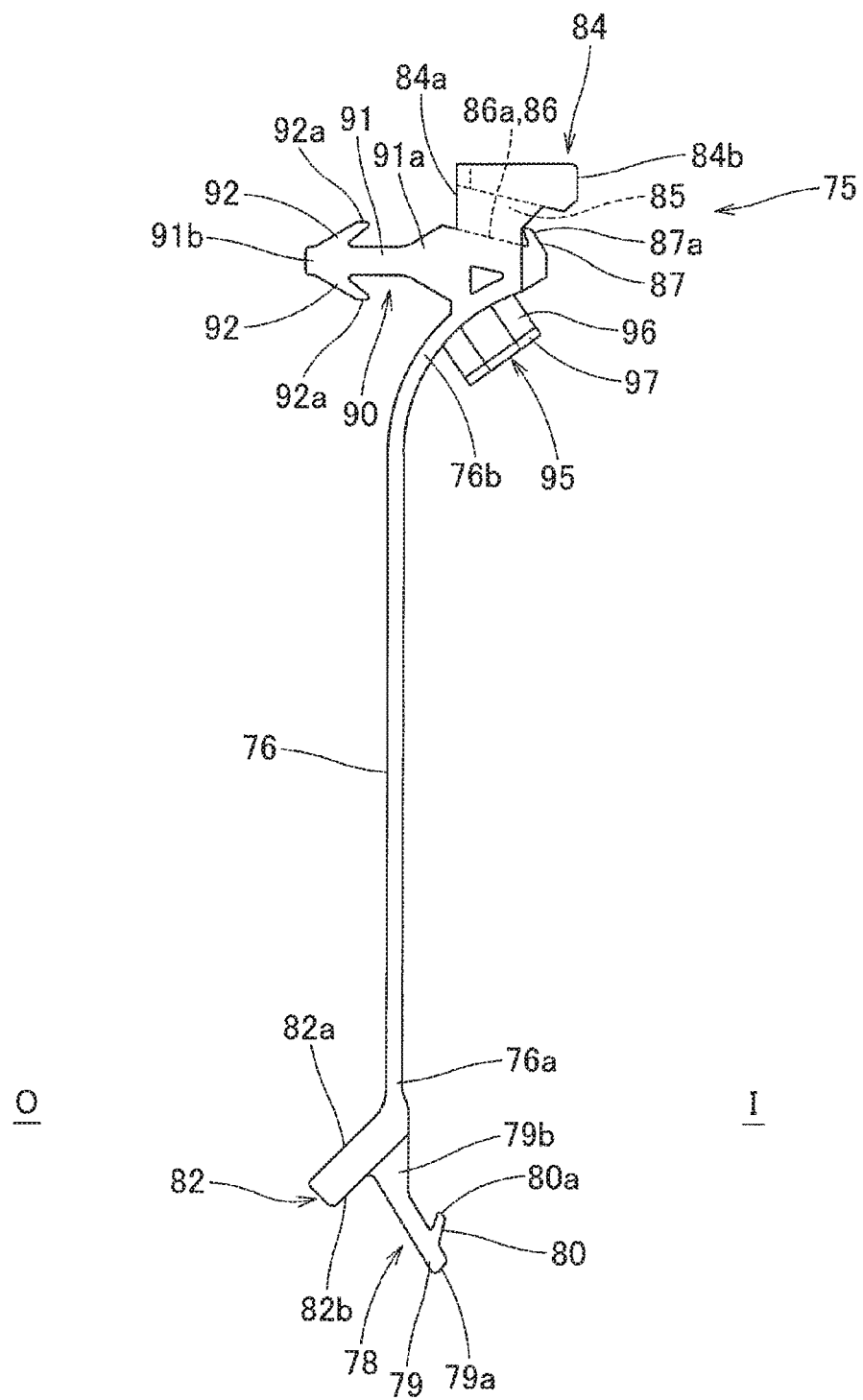
FIG. 11 is a front view of the winding band illustrated in FIGS. 10A and 10B.
Figures 12, 13:
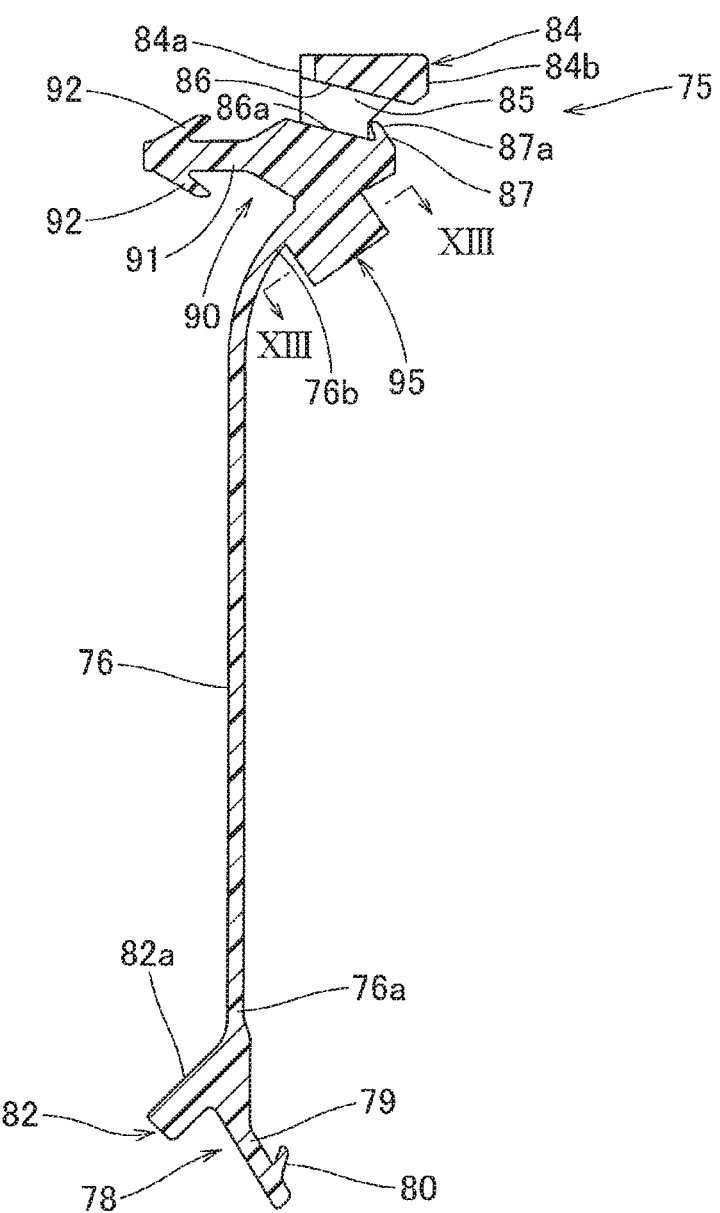
FIG. 12 is a longitudinal sectional view of the winding band illustrated in FIGS. 10A and 10B.
FIG. 13 is a cross-sectional view taken along line XIII-XIII in FIG. 12.

The upper reinforcing portion 65 is formed in a substantially inverted U-shaped frame shape that is formed to protrude to the vehicle inside I from the circumferential edge of the locking hole portion 59 (see FIGS. 5 and 6). In this embodiment, in the upper reinforcing portion 65, a front side wall portion 65*a* disposed on the front edge side of the locking hole portion 59 and a rear side wall portion 65*b* disposed on the rear edge side are configured to connect the inner circumferential surfaces 65*d* and 65*e* continuously from the front edge 60*c* and the rear edge 60*d* of the hole body 60 as illustrated in FIG. 9. An upper side wall portion 65*c* disposed to connect the upper ends of the front side wall portion 65*a* and the rear side wall portion 65*b* is disposed at a position above the upper edge 60*a* of the hole body 60 so as to insert the engaging target portion 84 to be described later of the winding band 75 therebetween (see FIG. 21). The area between the circumferential edge portion 62 of the hole body 60 and the upper side wall portion 65*c* constitutes a regulation surface 62*a* that comes in contact with a vehicle-outside surface 84*a* of the engaging target portion 84 in the winding band 75 to regulate the movement of the winding band 75 to the vehicle outside O when the locking clip 90 of the winding band 75 wound around the folded body 44 is pressed into the locking hole portion 59 (the hole body 60).

The lower reinforcing portion 66 has a degree of protruding to the vehicle inside I which is set to be smaller than that of the upper reinforcing portion 65, is formed to protrude to the vehicle inside I from the vehicle-inside surface of the receiving portion 52 (the side wall portion 53), and is formed continuously in a substantially U shape when viewed from the vehicle inside (see FIG. 6). In the lower reinforcing portion 66, a front side portion 66*a* disposed on the front side and a rear side portion 66*b* disposed on the rear side are disposed outward in the front-rear direction of the front side wall portion 65*a* and the rear side wall portion 65*b* in the upper reinforcing portion 65 when viewed from the vehicle inside I (see FIG. 6), but the front side portion 66*a* and the rear side portion 66*b* are formed to overlap the lower ends of the front side wall portion 65*a* and the rear side wall portion 65*b* in the front-rear direction on the upper end side (see FIG. 8). That is, in this embodiment, the locking hole portion 59 is surrounded with the upper reinforcing portion 65 and the lower reinforcing portion 66 over the substantially entire circumference. A lower side portion 66*c* disposed to connect the lower ends of the front side portion 66*a* and the rear side portion 66*b* is disposed in the vicinity of the lower end of the side wall portion 53 to be substantially parallel to the front-rear direction (the length direction f the folded body 44). The lower side portion 66*c* supports the band body 76 of the winding band 75 when the airbag 25 is unfolded and inflated. In the circumferential edge portion 62 of the hole body 60, the area surrounded with the lower reinforcing portion 66 constitutes a regulation surface 62*b* that comes in contact with the surface on the vehicle outside O of the hand body 76 in the winding band 75 to regulate the movement of the winding band 75 to the vehicle outside O when the locking clip 90 of the winding band 75 wound around the folded body 44 is pressed into the locking hole portion 59 (the hole body 60).

The attachment seat portion 69 is disposed at a position corresponding to the attachment portion 33A disposed to protrude from the folded body 44 and is formed at one position on the front side of the area receiving the connection port portion 28 in the case 50C of this embodiment (see FIG. 4). An attachment hole 69*a* that is opened in a substantially rectangular shape to pass the attachment leg portion 20 of the attachment clip 17 is formed in the attachment seat portion 69 to penetrate the attachment seat portion 69 in the vehicle inside-outside direction in correspondence with the attachment hole 33*a* of the attachment portion 33A.

Figure 20:
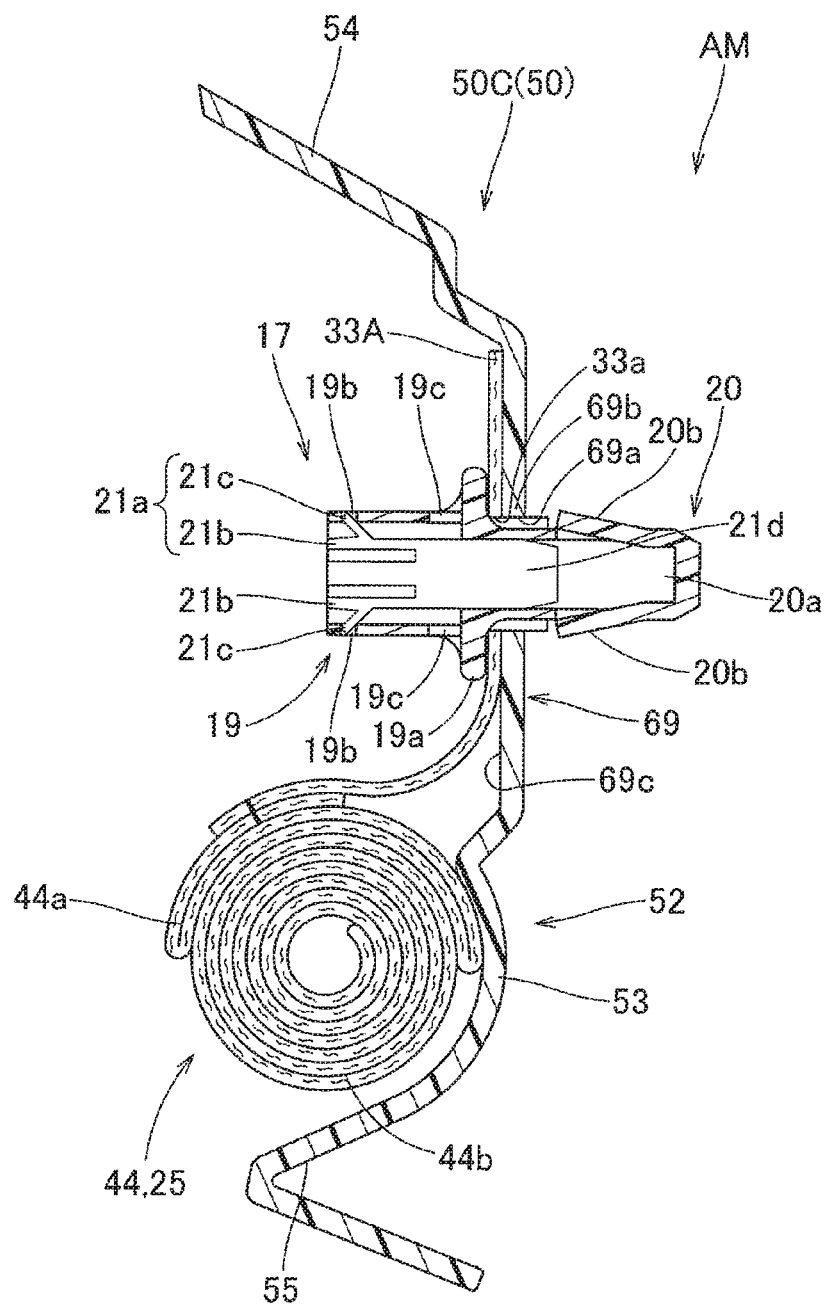
FIG. 20 is a longitudinal sectional view of the airbag assembly illustrating a section taken along line XX-XX in FIG. 19.

As illustrated in FIG. 2, the attachment clip 17 that attaches the attachment portion 33A along with the attachment seat portion 69 to the inner panel 2 is locked to the attachment hole 3 formed in the inner panel 2, is of an expansible rivet type formed of a synthetic resin, and includes an attachment base 18 and a push-pin 21 that and disposed in the attachment base 18 (see FIGS. 2 and 20). The attachment base 18 includes a base portion 19 that is disposed on the vehicle inside I and an attachment leg portion 20 that extends from the base portion 19 to the attachment hole 3 side of the inner panel 2 (to the vehicle outside O) and is attached to the circumferential edge of the attachment hole 3.

The base portion 19 includes a push-pin receiving portion 19*a* that receives the push-pin 21 therein before being attached to the surrounding of the attachment hole 3 and a pressure plate portion 19*d* that has a substantially rectangular plate shape enlarged in the front-rear direction and the up-down direction at a vehicle-outside end of the base portion 19. As illustrated in FIG. 20, the pressure plate portion 19*d* is a portion for pressing the attachment portion 33A to the attachment seat portion 69 when the attachment clip 17 is temporarily fixed to the attachment seat portion 69 of the case 50C with the attachment portion 33A interposed therebetween. The push-pin receiving portion 19*a* is formed by opening a part on the vehicle inside I so as to press the push-pin 21 to the vehicle outside O, and engaging hole portions 19*b* and 19*c* that can engage with the protrusion body 21*c* of the engaging protrusion 21*a* formed in the push-pin 21 are disposed in a part covering the upside of the push-pin 21 and a part covering the lower side thereof. The engaging hole portions 19*b* and 19*c* are formed at two positions along the vehicle inside-outside direction (the press-fit direction of the push-pin 21), the engaging hole portion 19*b* disposed on the vehicle inside engages with the protrusion body 21*c* of the push-pin 21 before being pressed as illustrated in FIG. 20, and the engaging hole portion 19c disposed on the vehicle outside O engages with the protrusion body 21c of the push-pin after being pressed as illustrated in FIG. 2.

The attachment leg portion 20 is inserted into the attachment holes 33a and 69a penetrating the attachment portion 33A of the airbag 25 and the attachment seat portion 69 of the case 50C, temporarily fixes the attachment portion 33A to the attachment seat portion 69, and is inserted into the attachment hole 3 formed in the inner panel 2 on the body 1 side of the vehicle V to attach the attachment seat portion 69 and the attachment portion 33A to the body 1 side. In the attachment leg portion 20, an insertion concave portion 20a is formed to communicate with the push-pin receiving portion 19a As illustrated in FIG. 2, the insertion concave portion 20a is a part into which an expanding shaft portion 21d of the push-pin 21 is inserted at the time of pressing. A pair of drawn hook portions 20b is formed in the attachment leg portion 20.

As illustrated in FIGS. 2 and 20, the push-pin 21 has a configuration in which an engaging protrusion 21a engaging with the engaging hole portions 19b and 19c formed in the push-pin receiving portion 19a is disposed on the base side (the vehicle inside I), and the expanding shaft portion 21d disposed between the drawn hook portions 20b at the time of pressing is disposed on the tip side (the vehicle outside O). The engaging protrusion 21a formed on the base side is formed at two positions facing each other in the vertical direction, and includes a deflation piece 21b that is disposed along the vehicle inside-outside direction and can be deflected inward in the vertical direction and a protrusion body 21c that is formed to protrude outward in the vertical direction on the tip side (the vehicle inside I) of the deflection piece 21b. The protrusion body 21c is inserted into the engaging hole portion 19b formed in the push-pin receiving portion 19a to engage with the circumferential edge of the engaging hole portion 19b. The engaging protrusion 21a is configured to detach the protrusion body 21c from the engaging hole portion 19b when the deflection piece 21b is deflected upward in the vertical direction. The push pin 21 is pressed to insert the expanding shaft portion 21d into the insertion concave portion 20a while detaching the protrusion body 21c from the engaging hole portion 19b by deflecting the deflection piece 21b inward in the vertical direction, the deflection piece 21b is restored when the protrusion body 21c reaches the engaging hole portion 19c on the vehicle outside O, and the protrusion body 21c is inserted into the engaging hole portion 19c on the vehicle outside O, whereby the engaging protrusion 21a engages with the circumferential edge of the engaging hole portion 19c. At this time, the expanding shaft portion 21d disposed on the tip side is inserted between the drawn hook portions 20b (see FIG. 2).

In the attachment clip 17, when the folded body 44 formed by folding the airbag 25 is received in the case 50 (50F, 50C, and 50R) to form an airbag assembly AM, the drawn hook portions 20b are hooked to the circumferential edge portion 69b of the attachment hole 69a of the attachment seat portion 69 and the attachment clip 17 is temporarily fixed to the attachment seat portion 69 via the attachment portion 33A interposed therebetween in a state (a state in which the protrusion body 21c engages with the circumferential edge of the engaging hole portion 19b) in which the push-pin 21 is not press-fit into the insertion concave portion 20a (see FIG. 20). In attaching the attachment portion 33A to the inner panel 2, in the airbag assembly AM, when the expanding shaft portion 21d is press-fit into the insertion concave portion 20a while the deflection piece 21b of the push-pin 21 is deflected to the center in the vertical direction in a state in which the attachment leg portion 20 of the attachment clip 17 protruding to the vehicle outside O from the attachment seat portion 69 of the case 50 (50F, 50C, and 50R) is inserted into the attachment hole 3 of the inner panel 2, the protrusion body 21c is inserted into the engaging hole portion 19c on the vehicle outside O (see FIG. 2) to engage with the circumferential edge of the engaging hole portion 19c, the expanding shaft portion 21d is inserted between the drawn hook portions 20b, the drawn hook portions 20b are hooked to the circumferential edge on the vehicle outside O of the attachment hole 3, and the attachment portion 33A is attached to the inner panel 2 on the body 1 side of the vehicle V along with the attachment seat portion 69 of the case 50 (50F, 50C, and 50R).

The winding band 75 is formed of a synthetic resin such as polyolefin-based thermoplastic elastomer (TPO) and is wound around the folded body 44 at plural positions eight positions in this embodiment) in the front-rear direction as illustrated in Section C of FIG. 14 in this embodiment. As illustrated in FIGS. 10A to 13, the winding band 75 includes a belt-shaped band body 76 that is wound around the folded body 44, an engaging claw portion 78 that is formed at one end of the band body 76, an engaging target portion 84 that is disposed at the other end of the band body 76, a locking clip 90 (attachment portion) that is attached to the attachment target portion 58 of the case 50, and a locking protrusion 95 that is hooked to the upper edge 25a of the airbag 25 in the folded body 44.

The winding band 76 has a belt shape that can be wound around the folded body 44. The band body 76 includes a claw-side end portion 76a having the engaging claw portion 78 formed at one end and a concave-side end portion 76b having the engaging target portion 84 formed at the other end.

The engaging claw portion 78 includes a protruding piece portion 79 that is formed to protrude from an edge of the claw-side end portion 76a of the band body 76 in the length direction of the band body 76 and a claw piece 80 that is formed to protrude downward from the lower surface on the tip 79a side of the protruding piece portion 79 (on the inner circumferential surface side when the band body is wound around the folded body 44). The protruding piece portion 79 has a substantially flat plate shape of which the width direction is parallel to the length direction of the folded body 44, and the width in the direction (the front-rear direction) parallel to the length direction of the folded body 44 is set to be smaller than the width of the band body 76 so as to be inserted into an engaging concave portion 85 to be described later in the engaging target portion 84. The protruding piece portion 79 is formed to protrude to the vehicle outside O in a vehicle-mounted state. The claw piece 80 formed on the tip 79a side of the protruding piece portion 79 is formed to be substantially parallel to the width direction of the protruding piece portion 79 (the length direction of the folded body 44) and is inclined with respect to the protruding piece portion 79 such that the tip 80a side faces the base portion 79b of the protruding piece portion 79. The claw piece 80 is configured to engage with the claw piece 87 formed on the inner circumferential surface 86 of the engaging concave portion 85 in the engaging target portion 84. In this embodiment, the claw piece 80 is set to be slightly smaller than the width of the protruding piece portion 79.

A pressing portion 82 for press-fitting the engaging claw portion 78 into the engaging concave portion 85 of the engaging target portion 84 is formed on the claw-side end portion 76a side of the band body 76. The pressing portion 82 has a flat plate shape is formed to rise from the base portion 79b of the protruding piece portion 79 in the engaging claw portion 78 in the vicinity of an edge of the claw-side end portion 76a of the band body 76. Specifically, the pressing portion 82 is configured to have the same width as the band body 76 and is formed to protrude outward from the outer circumferential surface of the band body 76. In the pressing portion 82, the outer surface (the surface on the vehicle inside I in a vehicle-mounted state) disposed to extend continuously from the outer circumferential surface of the band body 76 serves as a pressing operation surface 82a capable of press-fitting the engaging claw portion 78 into the engaging concave portion 85. The pressing portion 82 is disposed such that the pressing operation surface 82a is substantially perpendicular to the protruding direction of the engaging claw portion 78 (see FIGS. 11 and 12). Specifically, in this embodiment, the pressing portion 82 (pressing operation surface 82a) is disposed to be substantially parallel to the vertical direction in a vehicle-mounted state as illustrated in FIG. 3. In this embodiment, the engaging claw portion 78 is disposed to be substantially perpendicular to the pressing portion 82, and is specifically disposed to be slightly inclined with respect to the pressing portion 82 such that the tip thereof face the upside (see FIGS. 3 and 21).

The engaging target portion 84 has a substantially box shape including the engaging concave portion 85 into which the engaging claw portion 78 can be inserted to engage therewith. The engaging target portion 84 has a substantially rectangular parallelepiped shape, has a lower end connected to the concave-side end portion 76b of the band body 76, and has the same width as the band body 76 in this embodiment. The box-shaped engaging target portion 84 is also a part which is gripped by an operator in winding the winding band 75 around the folded body 44. The engaging concave portion 85 is formed in the protruding direction of the engaging claw portion 78 such as the engaging target portion 84 is concave to the vehicle outside so as to insert the engaging claw portion 78 thereinto. In this embodiment, the engaging concave portion 85 is formed to penetrate the engaging target portion 84 in the vehicle inside-outside direction. The engaging concave portion 85 has opening sizes in the vertical direction and the right-left direction which is set to insert the engaging target portion 84 thereinto. On the inner circumferential surface 86 of the engaging concave portion 85, a claw piece 87 capable of engaging with the claw piece 80 is formed at a vehicle-inside end of the lower surface 86a facing the folded body 44 to correspond to the claw piece 80 of the engaging claw portion 78. The claw piece 87 is disposed substantially in the length direction of the folded body 44 so as to be substantially along the claw piece 80 formed in the engaging claw portion 78. The claw piece 87 is formed such that the tip 87a protrudes upward to the vehicle outside O from the lower surface 86a of the inner circumferential surface 86 in the engaging concave portion 85 so as to engage with the claw piece 80.

That is, in the head protecting airbag device M according to this embodiment, the claw piece 87 extending from the engaging concave portion 85 side and the claw piece 80 extending from the protruding piece portion 79 are disposed between the surface (the bottom surface 86a) on the folded body 44 side on the inner circumferential surface 86 side of the engaging concave portion 85 and the protruding piece portion 79 of the engaging claw portion 78. In this embodiment, the engaging claw portion 78 engages with the engaging concave portion 85 of the engaging target portion 84 by causing the claw pieces 80 and 87 to engage with each other.

The engaging force of the claw pieces 80 and 87 is set to be mutually deflected to release the engaged state when the airbag 25 is unfolded and inflated and not to be easily release the engagement even when the pressing portion 82 or the engaging target portion 84 is pulled with a hand after the winding band is wound around the folded body 44. In this embodiment, the length L1 of the claw piece 80 is set to be slightly smaller than the length L2 of the claw piece 87 (see FIG. 21).

The locking clip 90 as an attachment portion is locked to the locking target portion 58 of the case 50 as an attachment target portion when the folded body 44 is received in the case 50. As illustrated in FIGS. 10A to 12, the locking clip 90 is formed to protrude to the vehicle outside O from the area below the engaging concave portion 85 on the lower side of the vehicle outside surface 84a of the engaging target portion 84 having a substantially box shape. The locking clip 90 includes a locking shaft portion 91 having a substantially flat plate shape which is formed to protrude to the vehicle outside O from the lower end of the engaging target portion 84 and locking claw portions 92 and 92 that are formed to protrude to the upper side and the lower side of the locking shaft portion 91. The locking shaft portion 91 has a flat panel shape in which the width direction is substantially parallel to the width direction of the band body 76 (the length direction of the folded body 44) and is configured to protrude substantially in the penetration direction of the engaging concave portion 85 in the engaging target portion 84. The locking shaft portion 91 is configured to match the width to the width of the engaging target portion 84 (the width of the band body 76) and is configured to hook a part of the base portion 91b facing the engaging target portion 84 to the engaging target portion 84 to increase the thickness so as to secure the locking strength to the circumferential edge of the locking hole portion 59 in the locking target portion 58 of the locking clip 90. Each locking claw portion 92 is formed to protrude upward or downward from the tip 91a of the locking shaft portion 91 and is inclined to scatter the tip 92a to the vehicle inside I. Each locking claw portion 92 is formed over the entire range of the locking shaft portion 91. The locking claw portions 92 are locked to the locking convex portion 61 formed on the upper edge 60a side and the lower edge 60b side of the hole body 60 when the locking clip 90 is inserted into the locking hole portion 59 formed in the locking target portion 58 of the case 50, and is formed to face the locking convex portion 61.

Figure 18:
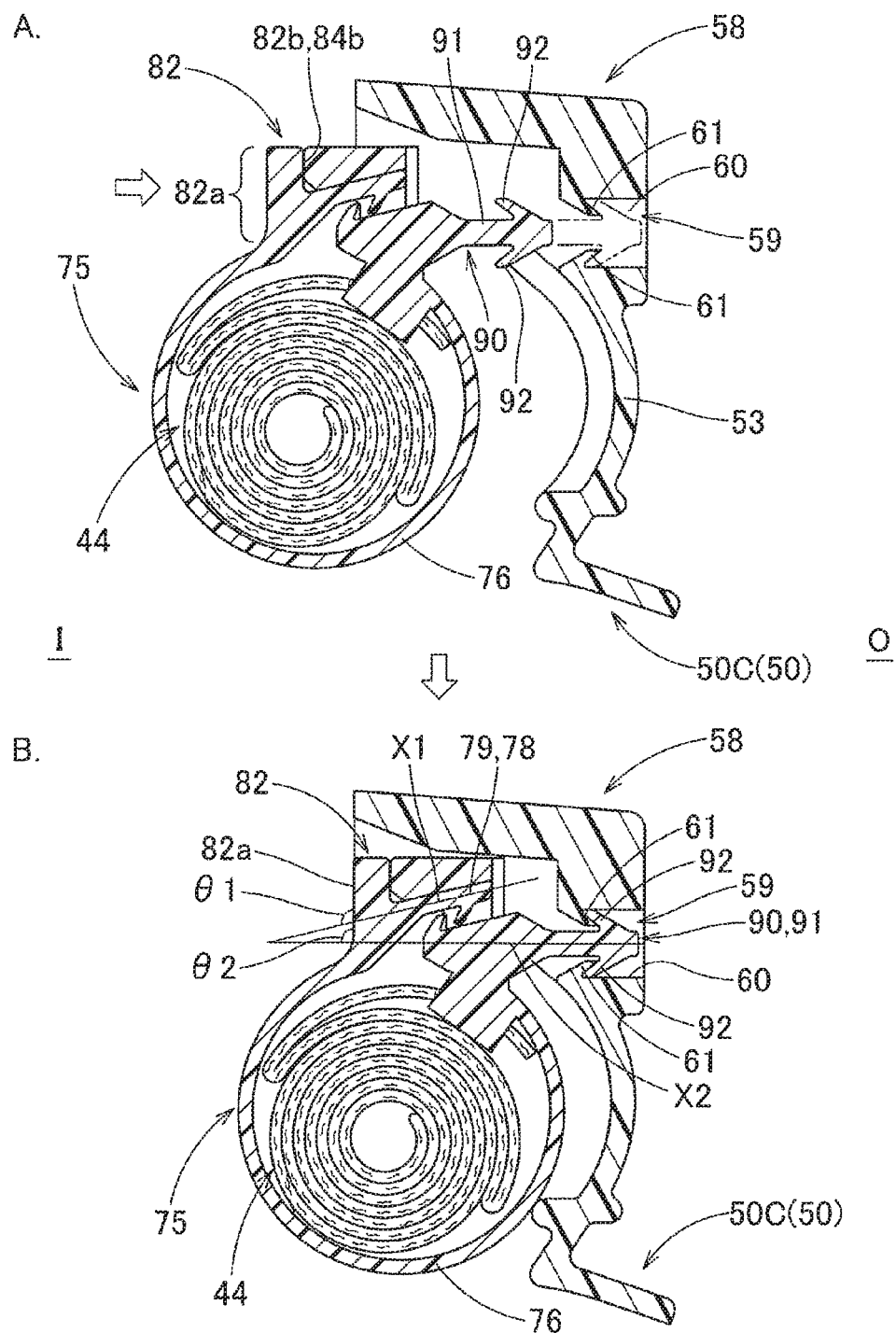
FIG. 18 is a longitudinal sectional view sequentially illustrating a process of locking a locking clip of the winding band wound around the folded body to a locking target portion of the case.

The locking clip 90 is disposed such that the protruding direction (the press-fit direction, the axial direction of the locking shaft portion 91) is substantially perpendicular to the pressing portion 82 (the pressing operation surface 82a) at the position on the vehicle outside O of the pressing portion 82 disposed in the claw-side end portion 76a of the band body 76 in a state in which the winding band 75 is wound around the folded body 44 (see Section A of FIG. 18). Specifically, the locking clip 90 is disposed in the area on the vehicle outside O of the pressing operation surface 82a in the pressing portion 82 (the area which can be press-fit by pressing the pressing operation surface 82a and which is the pressing portion or in the vicinity of the pressing portion 82 in the band body 76) in a state in which the winding band 75 is wound around the folded body 44. That is, the locking clip 90 is disposed such that the pressing direction to the locking hole portion 59 formed in the locking target portion 85 is substantially perpendicular to the pressing operation surface 82a of the pressing portion 82 when the locking clip 90 is attached to the case 50 in a state in which the locking clip is wound around the folded body 44. Accordingly, since a contact surface 82b which is the vehicle-outside surface of the pressing portion 82 comes in contact with the vehicle-inside surface 84b of the engaging target portion 84 by pressing the pressing operation surface 82a, the locking clip 90 can be inserted into the locking hole portion 59 by press-fitting the locking clip 90 along with the engaging target portion 84. When the locking clip 90 is press-fit into the locking hole portion 59 until the locking claw portions 92 are locked to the locking convex portions 61, the locking clip 90 can be locked to the locking target portion 58 (see FIG. 18).

Figure 16:
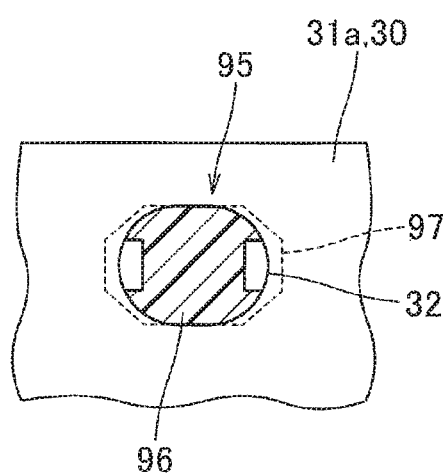
FIG. 16 is a partially enlarged cross-sectional view illustrating a state in which a locking protrusion formed in the winding band is locked to a circumferential edge of a through-hole of the airbag.

A locking protrusion 95 that is locked to the upper edge 25a side of the airbag 25 in the folded body 44 is formed on the concave-side end portion 76b side in which the engaging target portion 84 and the locking clip 90 are disposed in the band body 76. The locking protrusion 95 is formed to protrude inward (downward in a vehicle-mounted state) from the inner circumference side in a part on the concave-side end portion 76b of the band body 76. As illustrated in FIGS. 10A, 10B, 11, and 13, the locking protrusion 95 includes a rod-shaped locking neck portion 96 which can be inserted into the through-hole formed on the upper edge 25a side of the airbag 25 and a locking head portion 97 that is formed to expand on the tip side of the locking neck portion 96. In this embodiment, the locking neck portion 96 has a substantially elliptic cylinder shape of which the major axis is disposed in the width direction of the band body 76 and has a breaking concave portion (of which reference numerals is not illustrated) on both ends in the length direction. The locking head portion 97 is configured to extend from the tip of the locking neck portion 96 in a substantially flat plate shape on both sides in the width direction of the band body 76. In this embodiment, the locking neck portion 96 is inserted into the through-hole 32 so as to enlarge the circular through-hole 32 (see FIG. 16). The locking head portion 97 is configured to be locked to the circumferential edge of the through-hole 32 formed in the airbag 25.

When the locking protrusion 95 is disposed to be inserted into the through-hole 32 from the upside of the folded body 44 in winding the winding band 75 around the folded body 44, the locking head portion 97 is locked to the circumferential edge of the through hole 32 and can prevent the folded body 44 from rotating relative to the winding band 75 in winding the winding band 75 around the folded body 44 (in causing the engaging claw portion 78 to engage with the engaging target portion 84). Accordingly, when the locking head portion 97 of the locking protrusion 95 is locked to the circumferential edge of the through-hole 32, the engaging claw portion 78 can be received in the engaging concave portion 85 to cause the engaging claw portion 78 to easily engage with the engaging target portion 84 without strongly gripping the engaging target portion 84 and it is thus possible to easily wind the winding band 75 around the folded body 44. By locking the locking protrusion 95 formed in each winding band 75 to the upper edge 25a of the airbag 25, the folded body 44 can be mounted on the vehicle in a state in which the locking protrusion 95 is located on the vehicle inside below the through-hole 32 through which the locking protrusion 95 passes and the position of the fold VF (see Section A of FIG. 15) is substantially constant over the entire range in the front-rear direction.

Mounting of the head protecting airbag device M on the vehicle V will be described below. First, the airbag 25 is folded as illustrated in Section B of FIG. 14. In this embodiment, a fold substantially parallel to the upper edge 25a is formed in the area on the upper edge 25a side to form a bellows-folded portion 44a in a state in which the airbag 25 is unfolded flat, the lower area is folded by roll-folding of rolling the lower edge 25b to the vehicle-outside wall portion 26b to form a roll-folded portion 44b, thereby forming the folded body 44. In the folded body 44 according to this embodiment, as illustrated in Section A of FIG. 15, the fold VF folded at a position on the vehicle inside I is formed at the position close to the upper edge 25a and below the through-hole 32 in the bellows-folded portion 44a and the through-hole 32 is exposed from the upper surface of the folded body 44.

Figure 17:
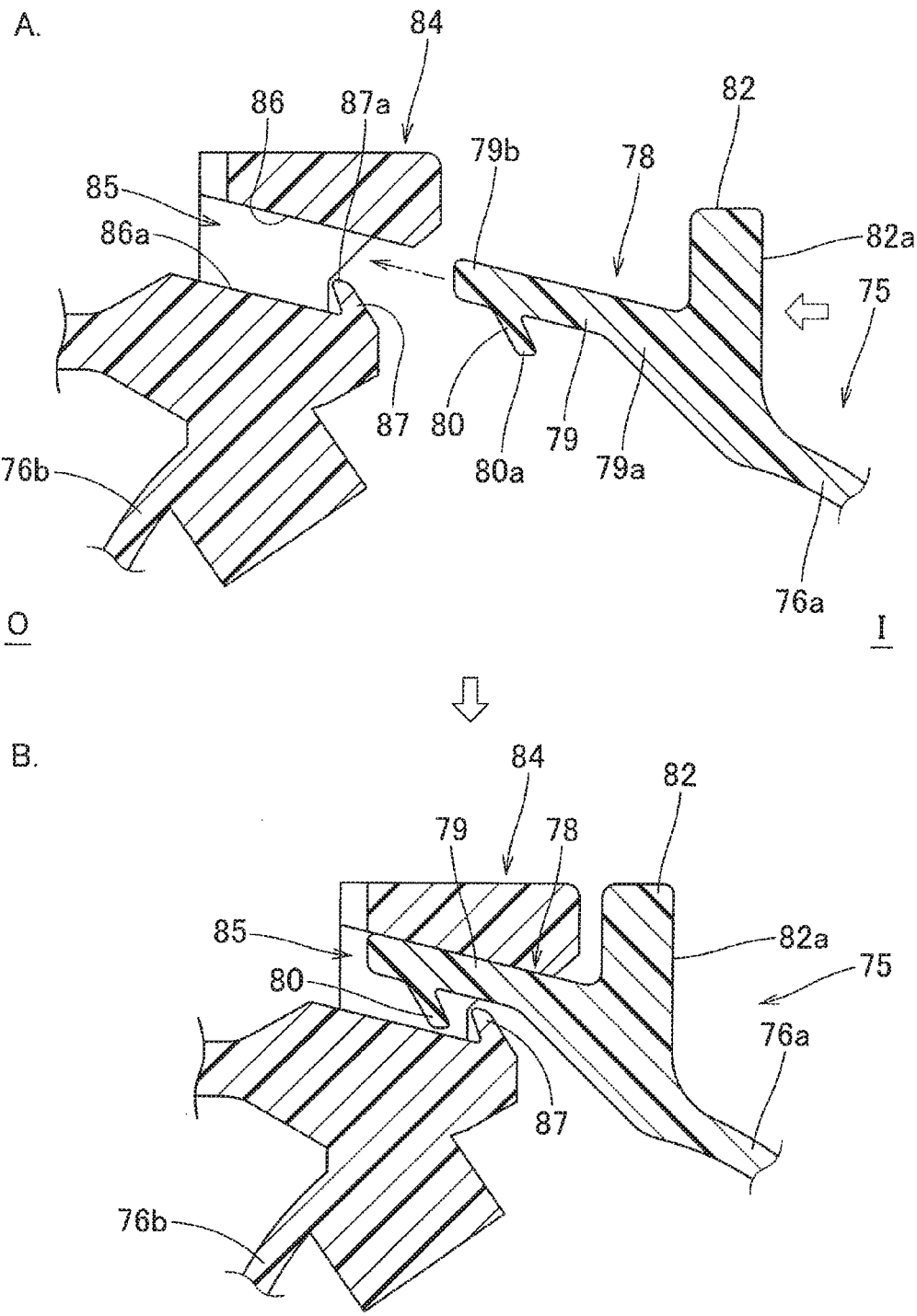
FIG. 17 is a longitudinal sectional view sequentially illustrating a process of causing an engaging claw portion to engage with an engaging target portion when the winding band is wound around the folded body.

As illustrated in Section C of FIG. 14, the winding band 75 is wound around the folded body 44 to surround the folded body 44. At this time, first, the locking protrusion 95 of the winding band 75 is inserted into the through-hole 32 and the locking head portion 97 of the locking protrusion 95 is locked to the circumferential edge of the through-hole 32 as illustrated in Sections A and B of FIG. 15. Subsequently, by gripping the pressing portion 82 and winding the band body 76 around the folded body 44, bringing the engaging claw portion 78 close to the engaging target portion 84, and pressing the pressing operation surface 82a of the pressing portion 82 to press-fit the engaging claw portion 78 into the engaging concave portion 85 as illustrated in Section C of FIG. 15, the claw piece 80 of the engaging claw portion 78 can engage with the claw piece 87 formed on the inner circumferential surface 86 of the engaging concave portion 85 and the engaging claw portion 78 can engage with the engaging target portion 84 as illustrated in Section B of FIG. 17. As illustrated in Section C of FIG. 14 and Section D of FIG. 15, the folded body 44 can be surrounded with the winding band 75 with folding collapse prevented.

Subsequently, the folded body 44 is attached to the case 50 (50F, 50C, and 50R) as an attachment target portion. At this time, in a state in which the attachment portion 33A overlaps the vehicle-inside surface 69c of the attachment seat portion 69, the attachment clip 17 is temporarily fixed to the attachment seat portion 69 by inserting the attachment leg portion 20 of the attachment clip 17 into the attachment holes 33a and 69a of the attachment portion 33A and the attachment seat portion 69 from the vehicle-inside surface 69c of the attachment seat portion 69 and locking the attachment leg portion 20 to the circumferential edge portion 69b of the attachment hole 69a in the attachment seat portion 69 (see FIG. 21). As illustrated in FIG. 18, by bringing the locking clip 90 formed in the winding band 75 close to the locking target portion 58, pressing the pressing operation surface 82a of the pressing portion 82, and press-fitting the locking clip 90 into the locking hole portion 59 of the locking target portion 58, the locking claw portion 92 of the locking clip 90 is locked to the locking convex portion 61 formed on the circumferential edge of the hole body 60 of the locking hole portion 59, and thus the locking clip 90 can be locked to the locking target portion 58. In addition, by attaching the attachment bracket 22 to the attachment portion 33B, inserting the inflator 12 having the attachment bracket 13 attached thereto into the connection port portion 28 of the airbag 25 protruding from the folded body 44, and connecting the connection port portion 28 to the inflator 12 using the clamp 15, it is possible to form the airbag assembly AM.

By inserting the attachment leg portion 20 of the attachment clip 17 protruding from the airbag assembly AM into the attachment hole 3 formed in the inner panel 2 and pressing the push-pin 21 to locate the expanding shaft portion 21d of the attachment clip 17 between the drawn hook portions 20b, as illustrated in FIG. 2, the drawn hook portions 20b can be locked to the circumferential edge of the attachment hole 3 and the attachment portion 33A along with the attachment seat portion 69 of the case 50 can be attached to the inner panel 2 on the body 1 side. At the same time, by fixing the attachment bracket 13 of the inflator 12 to a predetermined position of the inner panel 2 using a bolt 14 and fixing the attachment bracket 22 attached to the attachment portion 33B to a predetermined position of the inner panel 2 using a bolt 23, it is possible to assemble the airbag assembly AM into the vehicle V. Thereafter, by connecting a lead wire (not illustrated) extending form a controller for activating the inflator to the inflator 12 and attaching the front pillar garnish 5, the roof head lining 6, the central pillar garnish 7, and the rear pillar garnish 8 to the inner panel 2 on the body 1 side, it is possible to mount the head protecting airbag device M on the vehicle V.

Figure 22:
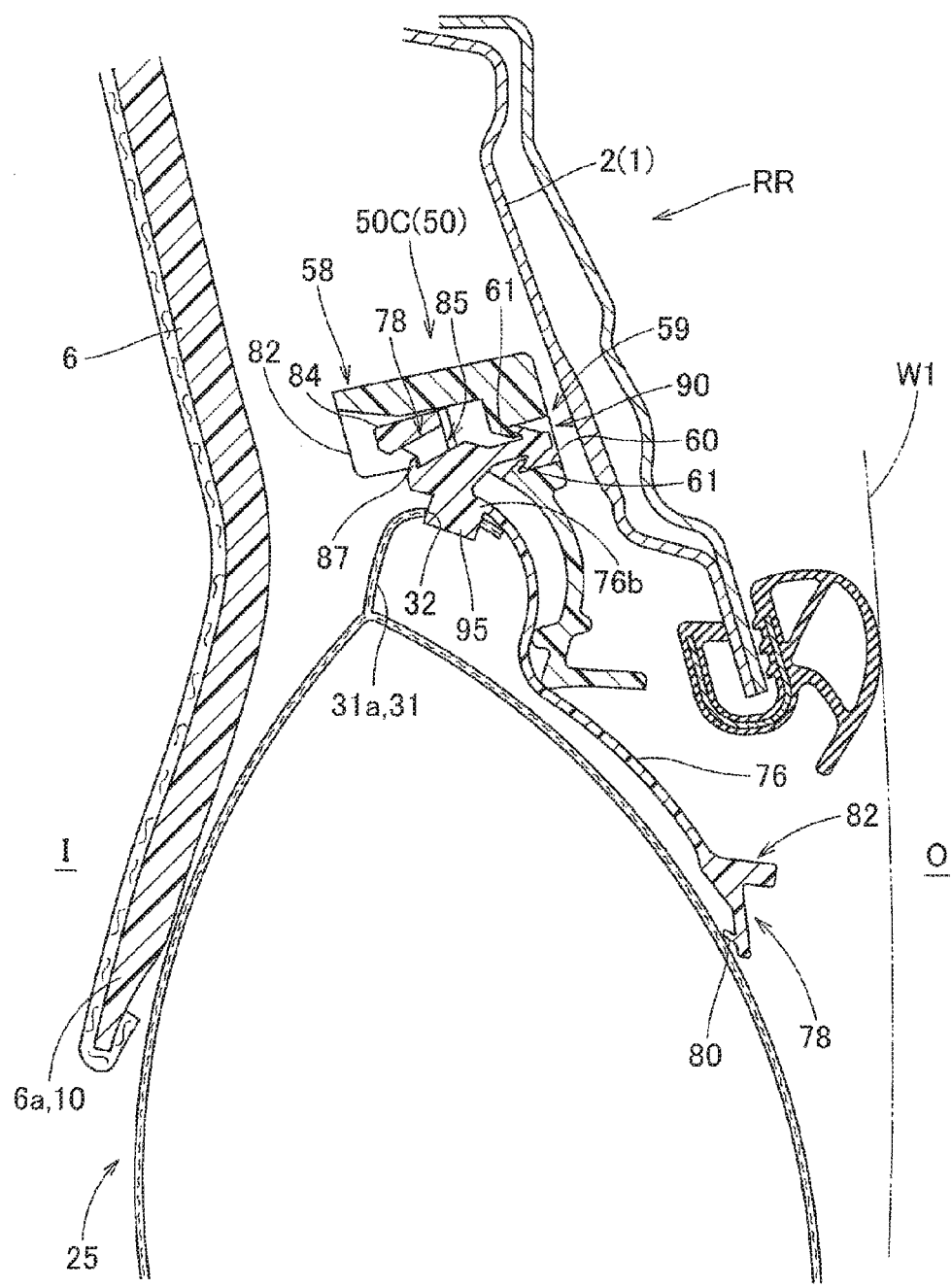
FIG. 22 is a longitudinal sectional view illustrating a state in which the airbag is fully inflated in the head protecting airbag device according to the embodiment.
Figure 23:
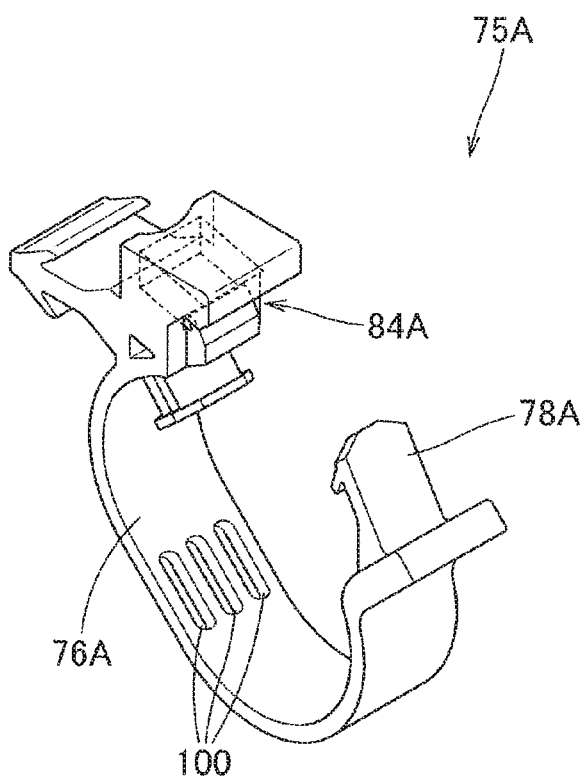
FIG. 23 is a perspective view of a winding band according to another embodiment.

When the inflator 12 is activated in response to an activation signal from the controller after the head protecting airbag device M is mounted on the vehicle V, the inflating gas ejected from the inflator 12 flows into the airbag 25, the inflating airbag 25 releases the engaged state between the engaging claw portion 78 and the engaging target portion 84 in the winding band 75 to press and open the airbag cover 10, is unfolded to protrude downward, and is fully inflated to cover the windows W1 and W2 and the vehicle inside of the central pillar portion CP and the rear pillar portion RP as indicated by a two-dot chained line in FIG. 1 and as illustrated in FIG. 22.

In the head protecting airbag device M according to this embodiment, since the winding band 75 includes the pressing portion 82 for press-fitting the engaging claw portion 78 into the engaging concave portion 85 of the engagement target portion 84, the engaging claw portion 78 can engage with the engaging target portion 84 and the winding band 75 can be wound around the folded body 44 (see FIGS. 15 and 17) by pressing the pressing operation surface 82a of the pressing portion 82 to press-fit the engaging claw portion 78 into the engaging target portion 84 in astute in which the band body 76 is located around the folded body 44 in winding the winding band 75 around the folded body 44. In the head protecting airbag device M according to this embodiment, the attachment portion (locking clip 90) for locking the winding band 75 to the case 50 as an attachment target portion is configured to be locked to the locking target portion 58 formed in the case 50 by pressing the pressing operation surface 82a of the pressing portion 82. Accordingly, in attaching the winding band 75 wound around the folded body 44 to the case 50, the locking clip 90 can be locked to the locking target portion 58 of the case 50 as illustrated in FIG. 18 by pressing the pressing operation surface 82a and it is thus possible to attach the winding band 75 wound around the folded body 44 to the case 50. That is, in the head protecting airbag device M according to this embodiment, since the work of winding the winding band 75 around the folded body 44 and the work of attaching the winding band 75 wound around the folded body 44 to the case 50 (the work of attaching the folded body 44 to the case 50) can be performed together by pressing the pressing operation surface 82a of the pressing portion 82 formed in the winding band 75, the workability is excellent and the number of working steps can be reduced. As a result, even when plural (eight) winding bands 75 are wound around the folded body 44 as in this embodiment, it is possible to suppress an increase in the number of work steps and to suppress an increase in cost.

Accordingly, in the head protecting airbag device M according to this embodiment, it is possible to improve the workability of the work of winding the winding band 75 around the folded body 44 and the work of attaching the folded body 44 to the case 50 as an attachment target portion.

Figure 21:
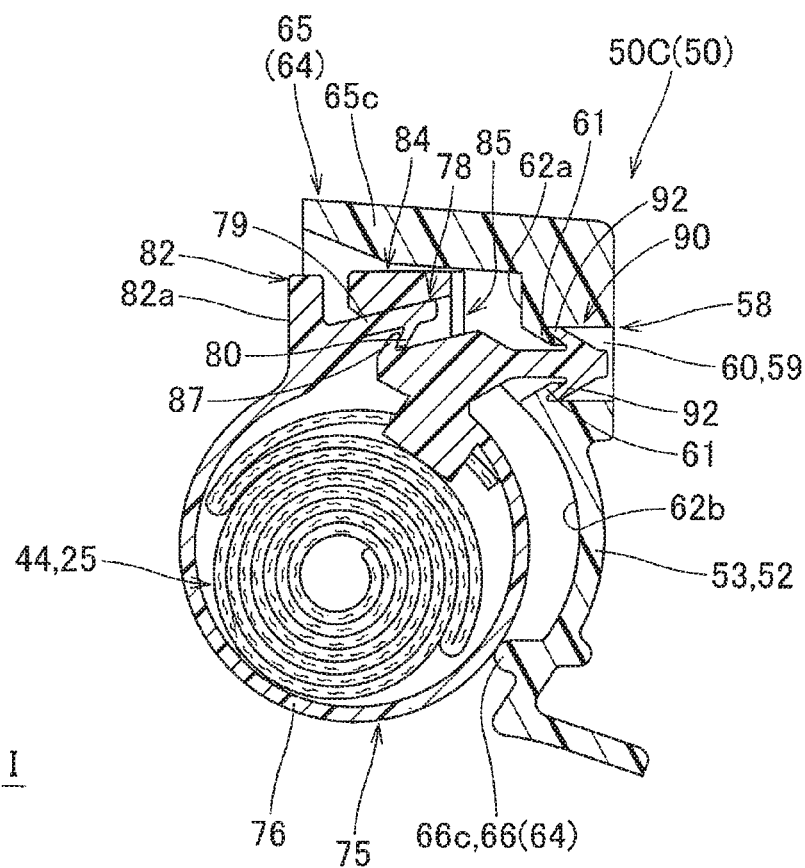
FIG. 21 is a longitudinal sectional view of the airbag assembly illustrating a section taken along line XXI-XXI in FIG. 19.
Figure 21:
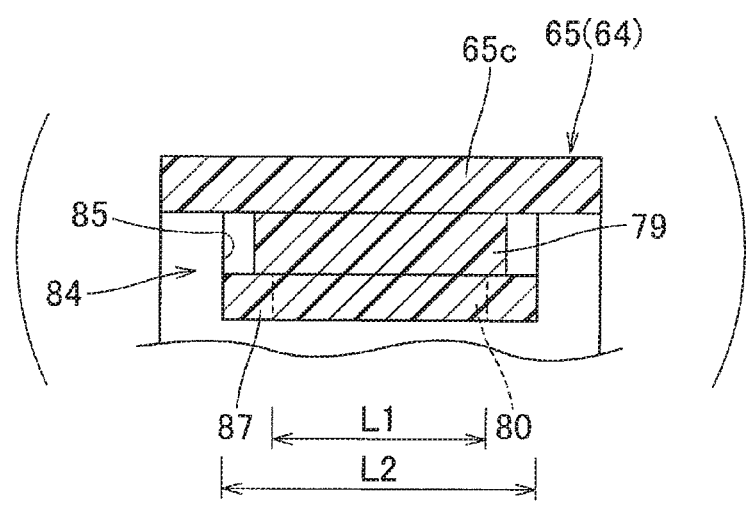

In the head protecting airbag device M according to this embodiment, the engaging claw portion 78 in the winding band 75 can be press-fit into the engaging concave portion 85 by pressing the pressing operation surface 82a, and the protruding direction thereof is not perpendicular to the pressing operation surface 82a but is slightly inclined upward to the vehicle outside O with respect to the locking clip 90 which is disposed to be perpendicular to the pressing operation surface 82a (see FIG. 21). As long as it can be press-fit by pressing the pressing operation surface, the protruding direction of the engaging claw portion or the protruding direction of the locking clip may not be strictly perpendicular to the pressing operation surface but may be substantially perpendicular thereto, that is, cross angles θ1 and θ2 of the pressing operation surface 82a and the axes X1 and X2 of the engaging claw portion 78 and the locking clip 90 illustrated in Section B of FIG. 18 may be set to a range of 60° to 120°. The axes X1 and X2 of the engaging claw portion 78 and the locking clip 90 preferably cross in the vicinity of the center of the pressing operation surface 82a, but may cross at the circumferential edge of the pressing operation surface 82a or in the vicinity thereof as long as the press-fitting operation can be smoothly performed.

In the head protecting airbag device M according to this embodiment, since the winding band 75 is configured to release the engaged state of the engaging claw portion 78 and the engaging target portion 84 in unfolding and inflating the airbag 25, it is possible to reliably suppress scattering of a part of the winding band 75 in unfolding and inflating the airbag 25, which is desirable.

Unless this point is considered, as in the winding band 75A illustrated in FIG. 22, a configuration in which a break-scheduled portion 100 which can be broken in unfolding and inflating the airbag is disposed in the band body 76A may be employed as a configuration in which the engaged state of the engaging claw portion 78A and the engaging target portion 84A cannot be easily released. The break-scheduled portion 100 illustrated in the drawing includes openings formed to penetrate the band body 76A, and the band body 75A is divided into the engaging claw portion 78A and the engaging target portion 84A by dividing a part between the openings. The shape of the break-scheduled portion is not limited to the through-hole shape, but for example, a thin part formed intermittently or continuously in the width direction may be formed in the band body to form the break-scheduled portion.

In this embodiment, since the winding band 75 is formed of thermoplastic elastomer, it is possible to reliably suppress generation of segmented pieces due to partial damage or division in unfolding and inflating the airbag 25.

In the head protecting airbag device M according to this embodiment, since the claw pieces 80 and 87 that can retain the engaged state in engagement and can be deflected to release the engaged state in unfolding and inflating the airbag 25 are formed on the engaging claw portion 78 and the inner circumferential surface 86 of the engaging concave portion 85, the disengaging timing can be adjusted by adjusting a deflection loads of the claw pieces 80 and 87, and it is thus possible to stabilize the disengaging timing of the engaging claw portion 78 and the engaging target portion 84 at the beginning of inflation of the airbag 25 with suppressed irregularity. In this embodiment, the claw pieces 80 and 87 capable of engaging with each other are formed on the engaging claw portion 78 and the inner circumferential surface 86 of the engaging concave portion 85, but any one claw piece may be formed. For example, a configuration in which a claw piece is formed on the engaging claw portion side and a concave portion engaging with the claw piece inserted thereinto is formed on the inner circumferential surface side of the engaging concave portion may be employed.

In the head protecting airbag device M according to this embodiment, since the claw pieces 80 and 87 are disposed along the length direction of the folded body 44, it is possible to adjust the disengaging timing of the engaging claw portion 78 and the engaging target portion 84 by adjusting the lengths (widths) L1 and L2 of the claw pieces 80 and 97 (see FIG. 22) in the length direction of the folded body 44.

In the head protecting airbag device M according to this embodiment, the claw pieces 80 and 87 are disposed between the surface (the lower surface 86a) on the folded body 44 side on the inner circumference of the engaging concave portion 85 and the engaging claw portion 78 (the protruding claw portion 79). That is, in the head protecting airbag device M according to this embodiment, when the inflating airbag 25 presses the band body 76 to be opened at the beginning of inflation of the airbag 25, the claw piece 80 formed in the engaging claw portion 78 is not disposed in the direction (to the top surface side in the moving direction of the protruding claw portion 79 to direct the tip 79a to the upside) in which the engaged state of the engaging claw portion 78 with the engaging target portion 84 is released. Accordingly, in comparison with the claw piece is disposed between the surface separated from the folded body on the inner circumferential surface side of the engaging concave portion and the engaging claw portion, it is possible to easily release the engaged state of the engaging claw portion 78 and the engaging target portion 84 in unfolding and inflating the airbag 25. This is because when the claw piece is disposed on the top surface side which is the surface separated from the folded body in the engaging claw portion and engages with the surface separated from the folded body on the inner circumferential surface side of the engaging concave portion, the claw piece may be further pressed to the inner circumferential surface side of the engaging concave portion and the engaged state may not be rapidly released in opening the band body at the begging of inflation of the airbag. However, in this embodiment, since the claw piece is formed of thermoplastic elastomer so as to be deflected, the engagement can be released by deflection. Unless this point is considered, the claw piece may be disposed between the surface separated from the folded body on the inner circumferential surface side of the engaging concave portion and the engaging claw portion.

In this embodiment, the case is exemplified as the attachment target portion to which the folded body is attached, but the attachment target portion is not limited to the case. For example, the head protecting airbag device according to this embodiment can be applied to a configuration in which the head protecting airbag device is not received in the case but is directly attached to the inner panel. In this case, the inner panel of the vehicle serves as the attachment target portion.

What is claimed is:

1. A head protecting airbag device comprising:
    an airbag configured to cover a window of a vehicle when the airbag is unfolded and inflated, the airbag being folded and received on a vehicle-inside upper edge side of the window;
    a winding band, formed of flexible synthetic resin, configured to prevent folding collapse of the airbag, wound around a folded body which is formed by folding the airbag so as to release a wound state of the airbag in unfolding and inflating the airbag, the winding band including:
        attachment portion being pressed and locked to an attachment target portion to attach the folded body to the attachment target portion;
        a band body having a belt-like shape, the band body being wound around the folded body;
        an engaging claw portion formed at one end of the band body; and
        an engaging target portion disposed at the other end of the hand body, the engaging target portion including an engaging concave portion into which the engaging claw portion is inserted to engage therewith; and
    a pressing portion having a pressing operation surface configured to press-fit the engaging claw portion into the engaging concave portion, the pressing portion being disposed at a claw-side end of the band body so that the pressing operation surface is substantially perpendicular to a press-fit direction of the engaging claw portion, wherein
    the attachment portion is disposed at a concave-side end of the band body so that the press-fit direction to the attachment target portion at the time of locking is substantially perpendicular to the pressing operation surface so as to press and lock the pressing operation surface to the attachment target portion.

2. The head protecting airbag device according to claim 1, wherein
    the winding band is configured to release an engaged state of the engaging claw portion and the engaging target portion in releasing the wound state around the airbag.

3. The head protecting airbag device according to claim 2, wherein the winding band is formed of thermoplastic elastomer.

4. The head protecting airbag device according to claim 3, further comprising
    a claw piece formed on an inner circumferential surface of at least one of the engaging claw portion and the engaging concave portion, wherein
    the claw piece is configured to retain an engaged state at the time of engagement, and is bent to release the wound state around the airbag at the time of release.

5. The head protecting airbag device according to claim 4, wherein
    the claw piece is disposed along a length direction of the folded body.

6. The head protecting airbag device according to claim 5, wherein
    the claw piece is disposed between a folded-body-side surface on the inner circumference side of the engaging concave portion and the engaging claw portion.

7. The head protecting airbag device according to claim 4, wherein
    the claw piece is disposed between a folded-body-side surface on the inner circumference side of the engaging concave portion and the engaging claw portion.

8. The head protecting airbag device according to claim 1, wherein
    the winding band is configured to release the wound state around the airbag by breaking the band body.

* * * * *